(12) United States Patent　(10) Patent No.: US 8,936,419 B1
Islam　(45) Date of Patent: Jan. 20, 2015

(54) RESTRAINT SYSTEM FOR RESTRAINING A UNIT LOAD DEVICE IN AN AIRCRAFT

(71) Applicant: AAR Corp., Wood Dale, IL (US)

(72) Inventor: Amirul Islam, Clayton, NC (US)

(73) Assignee: AAR Corp., Wood Dale, IL (US)

( * ) Notice: Subject to any disclaimer, the term of this patent is extended or adjusted under 35 U.S.C. 154(b) by 0 days.

(21) Appl. No.: 13/967,830

(22) Filed: Aug. 15, 2013

(51) Int. Cl.
*B60P 7/08* (2006.01)
*B64D 9/00* (2006.01)

(52) U.S. Cl.
CPC ..................................... *B64D 9/003* (2013.01)
USPC ......................................................... 410/80

(58) Field of Classification Search
CPC ............ B60P 3/00; B60P 7/08; B60P 7/0807; B60P 7/0892; B60P 7/10; B60P 7/13; B64D 9/003
USPC ............ 410/69, 77, 80, 94; 244/118.1, 137.1; 248/503
See application file for complete search history.

(56) References Cited

U.S. PATENT DOCUMENTS

| | | |
|---|---|---|
| 4,372,715 A | 2/1983 | Naffa |
| 4,375,932 A | 3/1983 | Alberti |
| 4,415,298 A | 11/1983 | Voigt |
| 5,090,638 A * | 2/1992 | Eilenstein-Wiegmanns et al. |
| 5,265,991 A | 11/1993 | Herrick et al. |
| 5,316,242 A | 5/1994 | Eilenstein-Wiegmann et al. |
| 5,390,775 A | 2/1995 | Herrick et al. |
| 6,030,159 A | 2/2000 | Herrick et al. |
| 6,622,640 B2 | 9/2003 | Taylor et al. |
| 6,957,613 B2 | 10/2005 | Taylor et al. |
| 7,922,431 B2 | 4/2011 | Schulze et al. |
| 7,926,762 B2 | 4/2011 | Oetken et al. |
| 8,118,524 B2 | 2/2012 | Schulze et al. |
| 8,221,038 B1 | 7/2012 | Moradians |
| 2003/0031523 A1* | 2/2003 | Afful .............................. 410/80 |
| 2012/0119026 A1 | 5/2012 | Huber et al. |
| 2012/0126058 A1 | 5/2012 | Huber et al. |

* cited by examiner

*Primary Examiner* — Stephen Gordon
(74) *Attorney, Agent, or Firm* — Barnes & Thornburg LLP

(57) ABSTRACT

A restraint system for releasably restraining a unit load device in an aircraft. The restraint system includes a guide rail adapted to be connected to the aircraft and one or more restraint mechanisms connected to the guide rail. Each restraint mechanism includes a pawl that is selectively pivotal between a locked position and an unlocked position. The guide rail is adapted to restrain movement of the unit load device in the transverse direction and the pawl of the restraint mechanism is adapted to restrain movement of the unit load device in the longitudinal and vertical directions when the pawl is in the locked position.

28 Claims, 23 Drawing Sheets

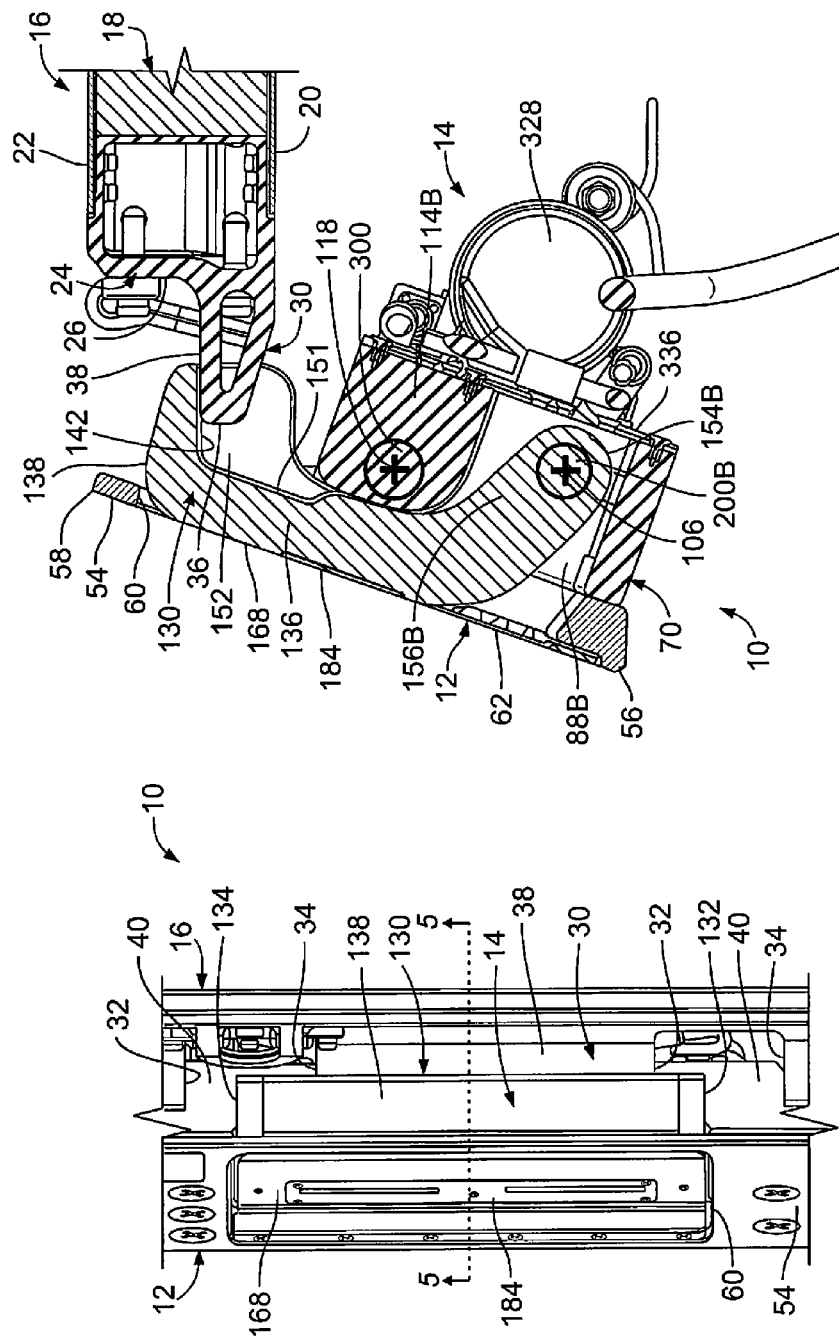

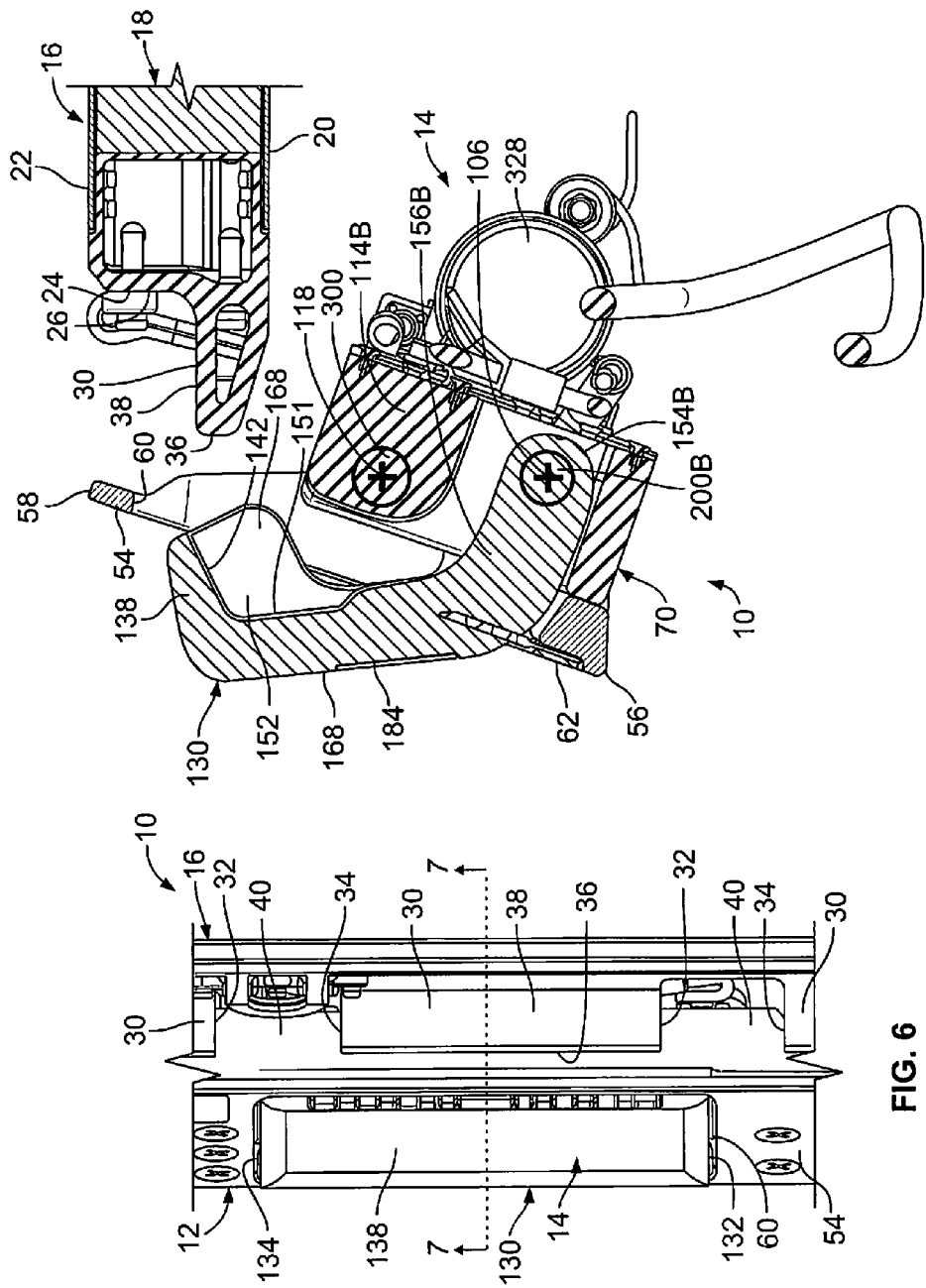

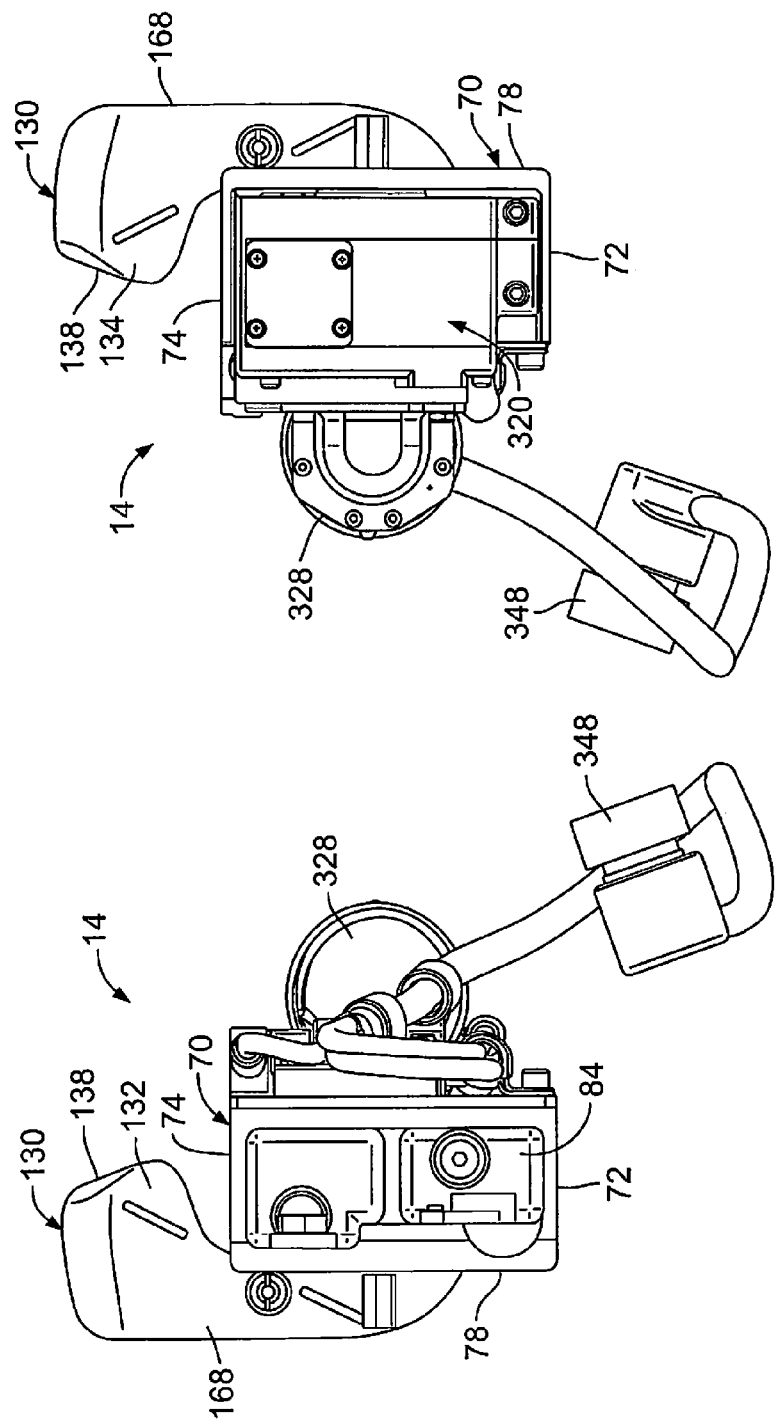

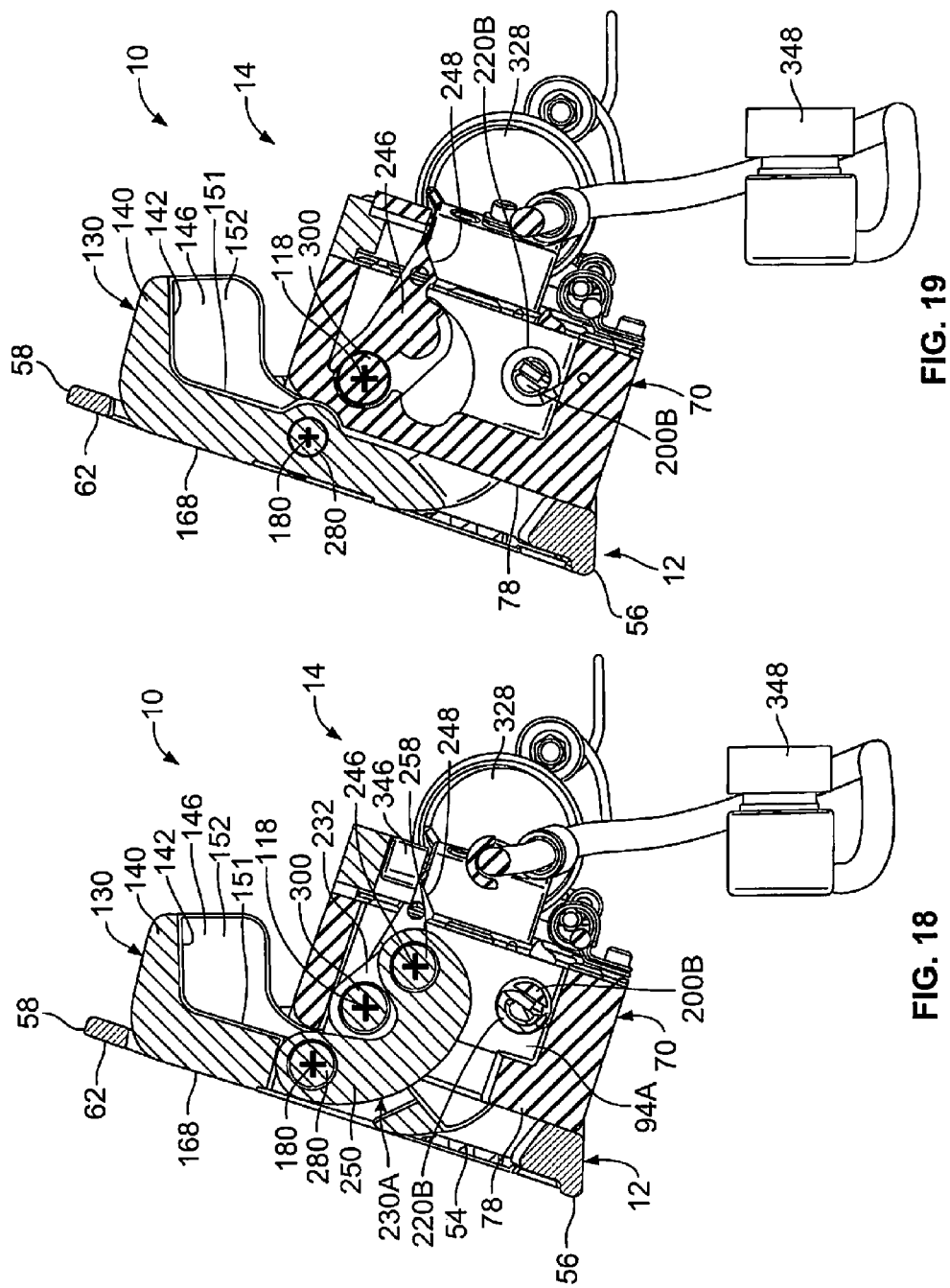

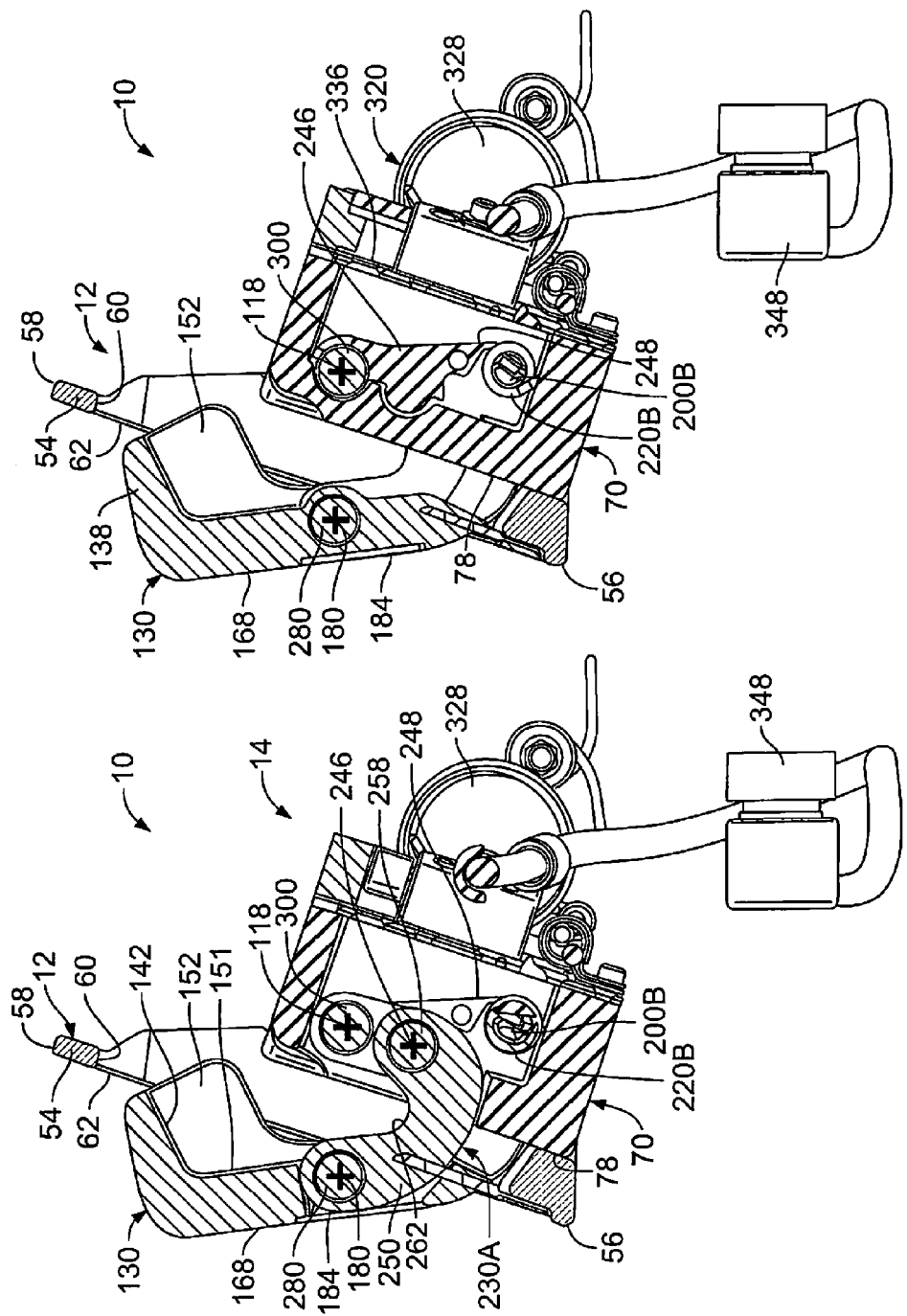

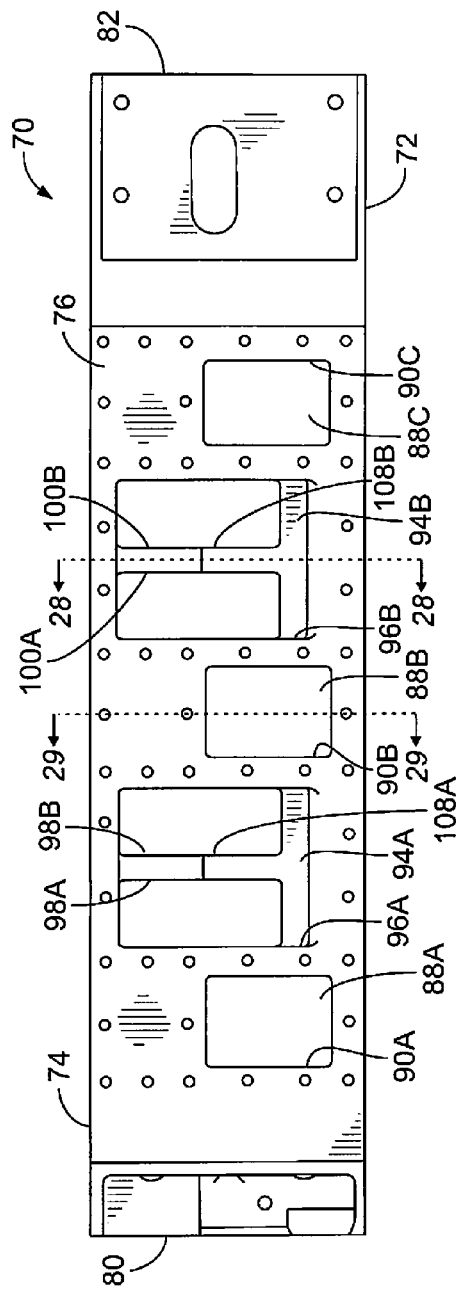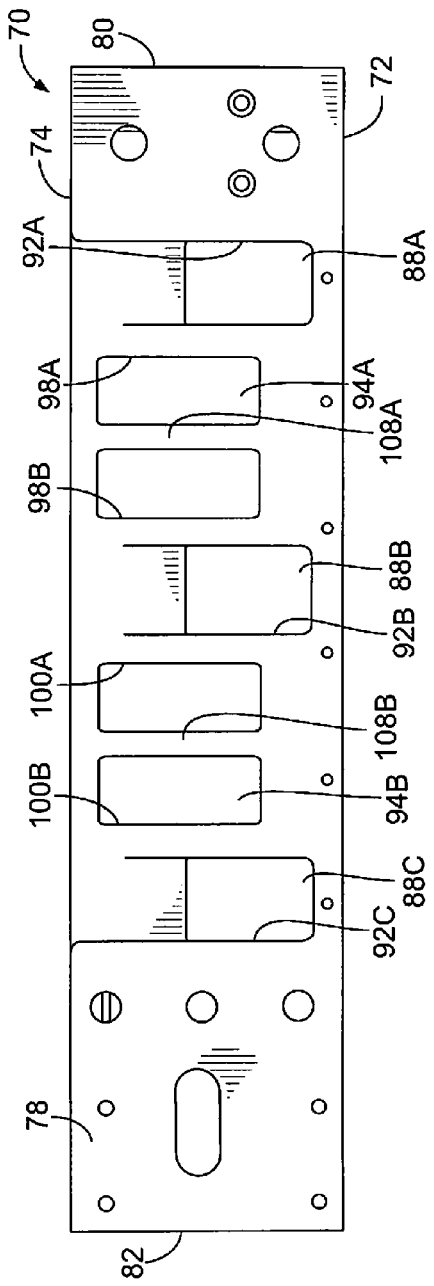

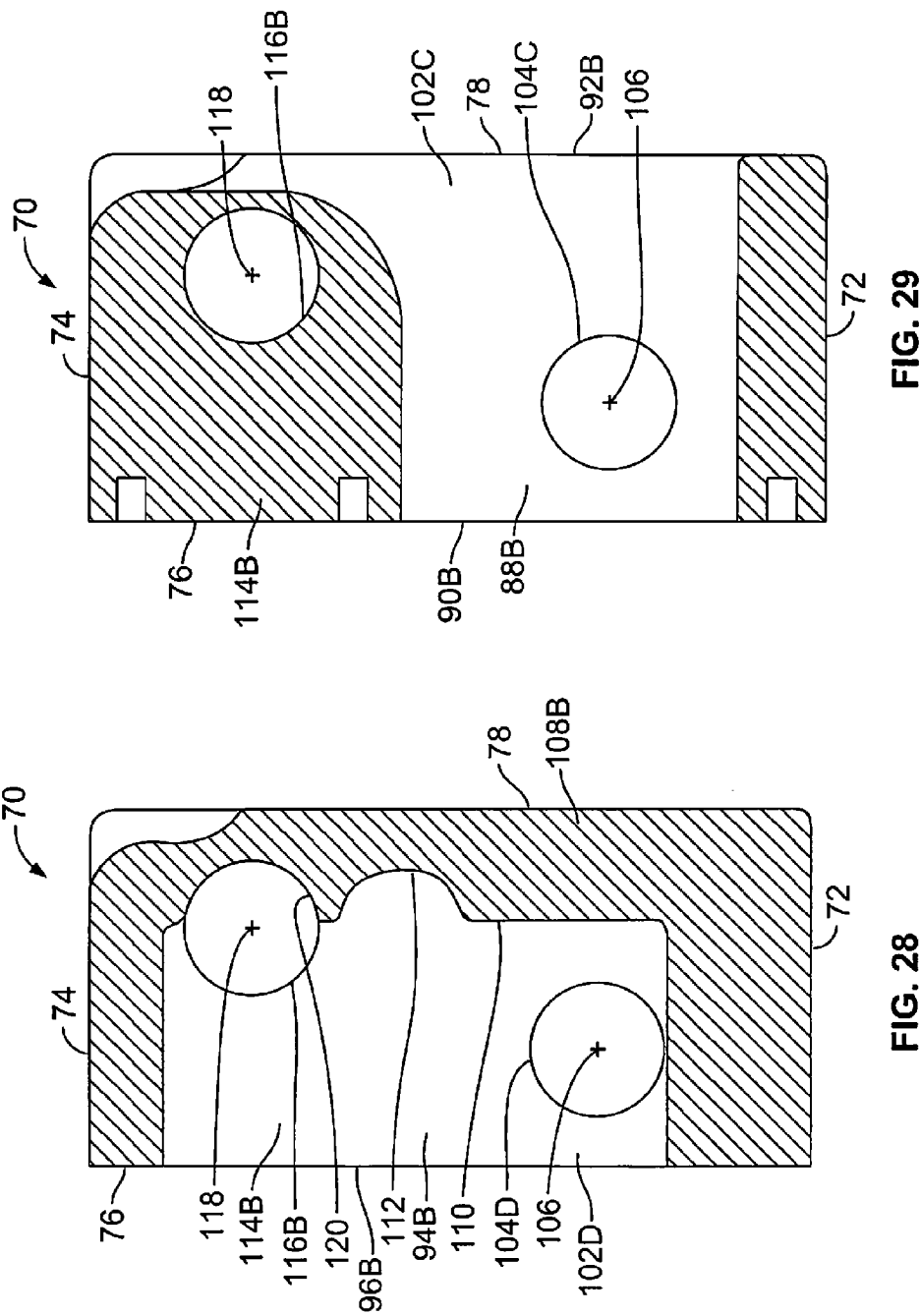

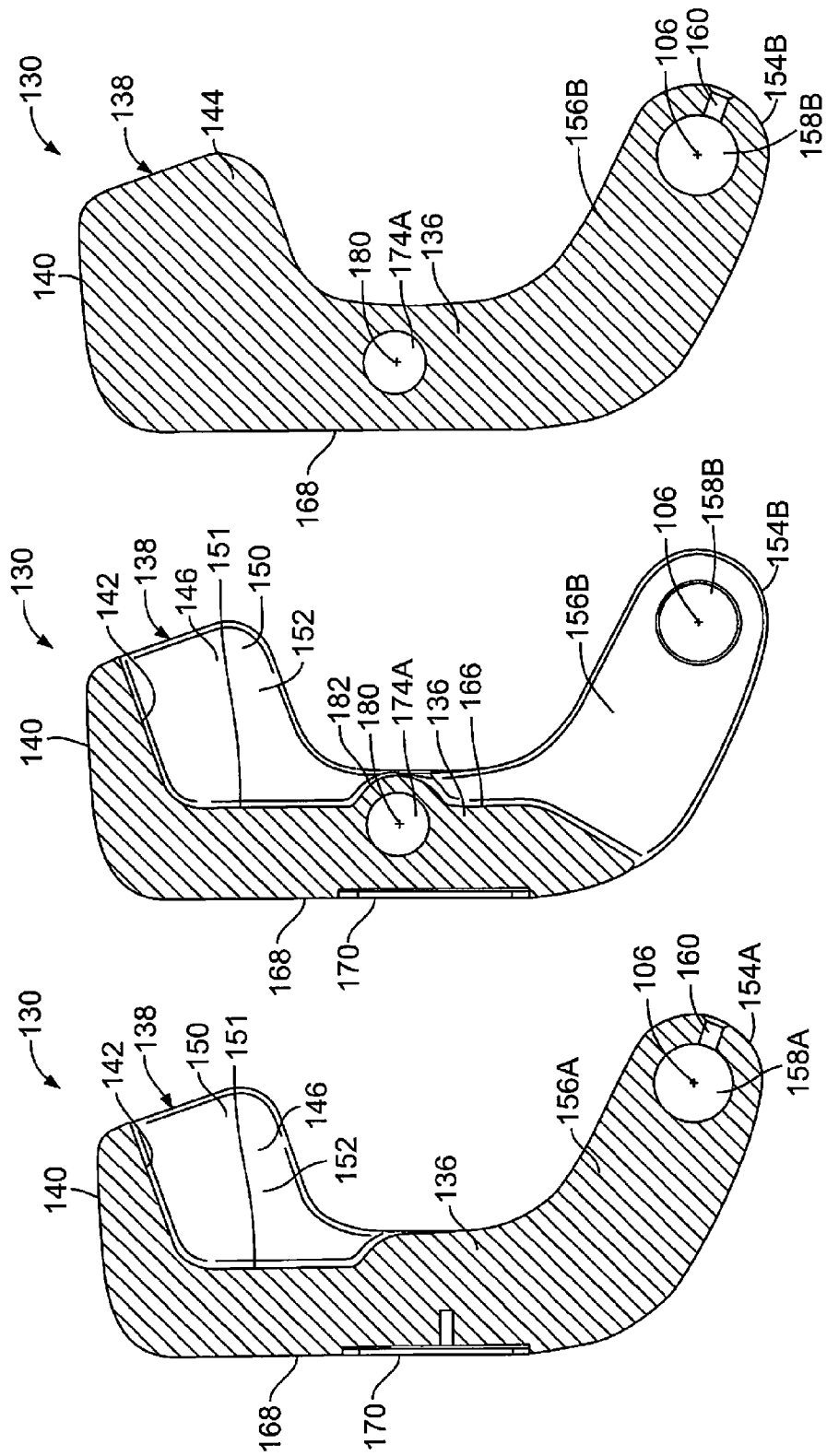

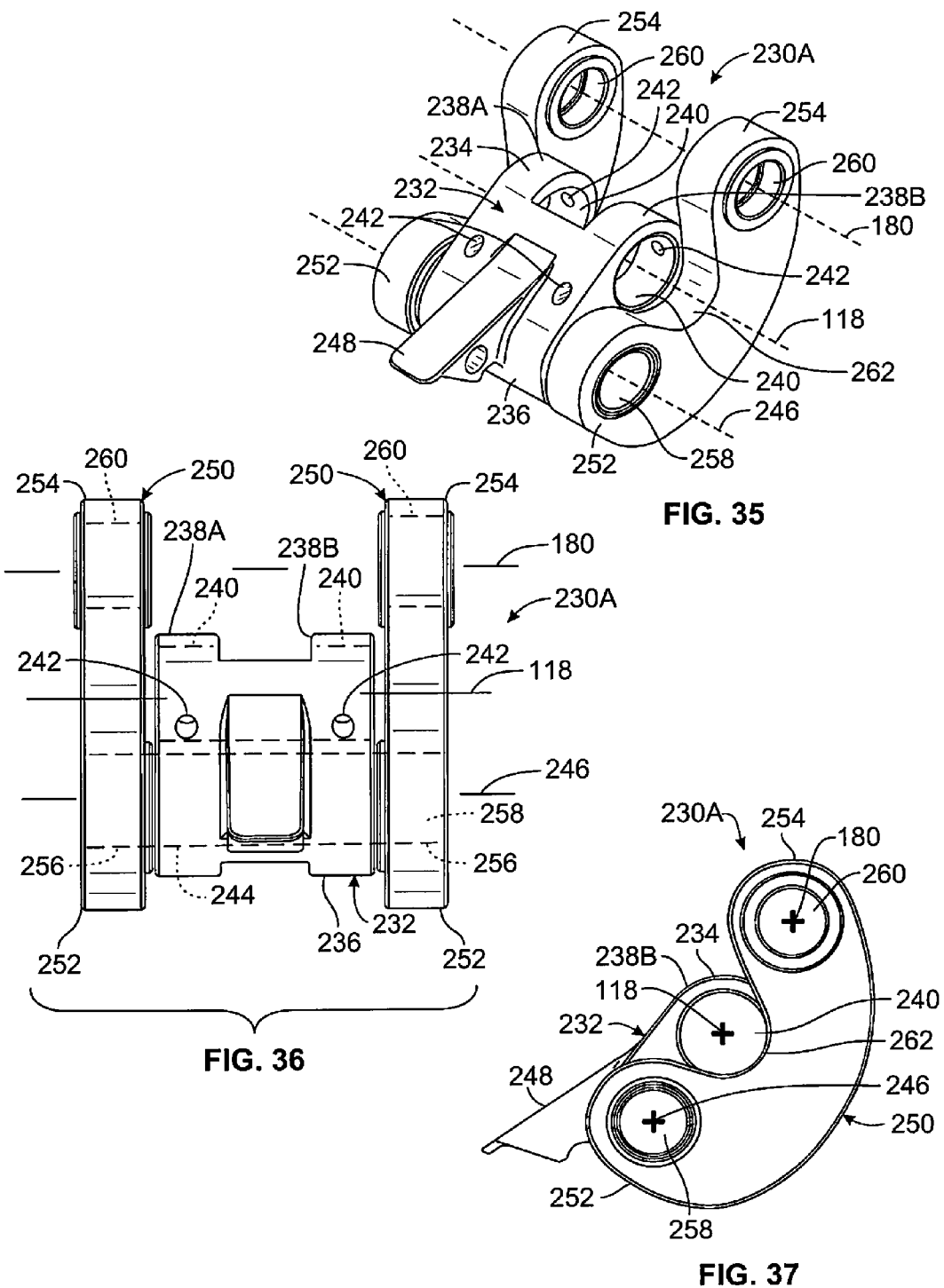

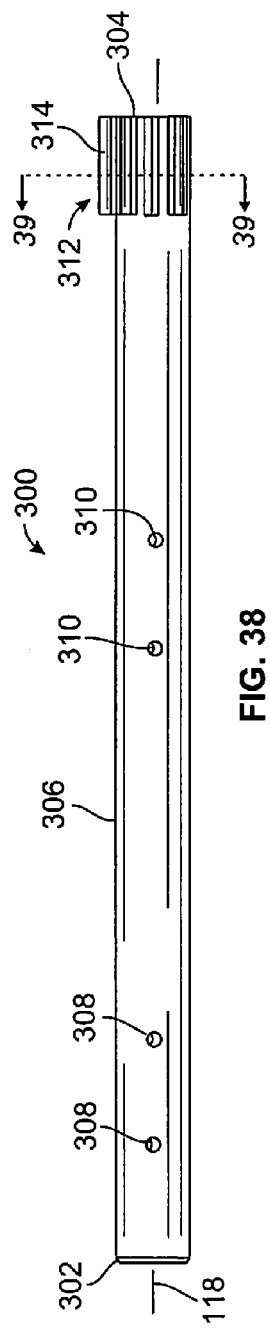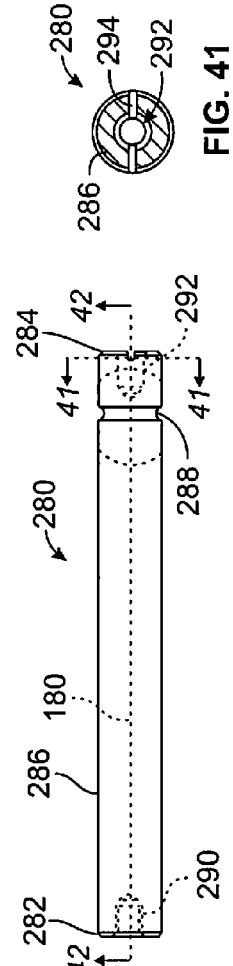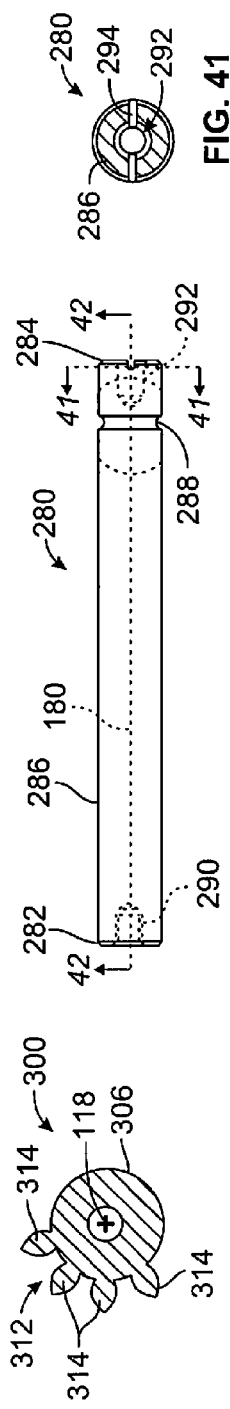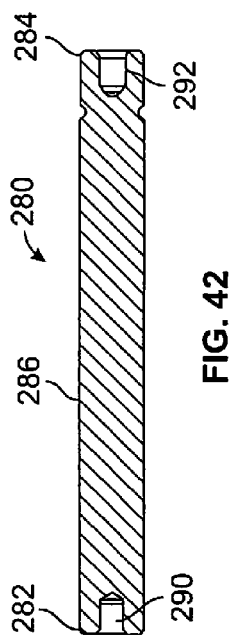

RESTRAINT SYSTEM FOR RESTRAINING A UNIT LOAD DEVICE IN AN AIRCRAFT

BACKGROUND

The present disclosure is directed to a restraint system for releasably restraining a unit load device in an aircraft, and in particular to a restraint system including a guide rail and one or more restraint mechanisms connected to the guide rail. Each restraint mechanism includes a pawl adapted to be selectively moved between a locked position, wherein the pawl is adapted to restrain movement of the unit load device, and an unlocked position wherein the pawl is adapted to permit movement of the unit load device.

Cargo may be transported in the cargo hold and/or cargo ramp of an aircraft on a unit load device (ULD) such as a cargo container or a cargo pallet. The ULD is releasably secured to the cargo floor within the cargo bay of the aircraft to restrain movement of the ULD and its cargo within the cargo bay during transport. The ULD and its associated cargo must be released from the cargo floor of the aircraft to allow movement of the ULD and its associated cargo within the cargo bay during loading and unloading of the ULD and its associated cargo.

BRIEF DESCRIPTION OF THE DRAWINGS

FIG. 4 is an enlarged partial top plan view of the restraint assembly shown with the pawl of the restraint mechanism in the locked position and in engagement with a cargo pallet;

FIG. 5 is a cross sectional view taken along line 5-5 of FIG. 4;

FIG. 6 is an enlarged partial top plan view of the restraint assembly shown with the pawl of the restraint mechanism in the unlocked position and disengaged from the cargo pallet;

FIG. 7 is a cross sectional view taken along line 7-7 of FIG. 6;

FIG. 14 is a left end view of the cargo restraint mechanism shown with the pawl in the locked position;

FIG. 15 is a right end view of the cargo restraint mechanism shown with the pawl in the locked position;

FIG. 18 is a cross sectional view taken along line 18-18 of FIG. 16;

FIG. 19 is a cross sectional view taken along line 19-19 of FIG. 16;

FIG. 22 is a cross sectional view taken along line 22-22 of FIG. 20;

FIG. 23 is a cross sectional view taken along line 23-23 of FIG. 20;

FIG. 26 is a front elevational view of the inboard front side of the housing of the restraint mechanism;

FIG. 27 is a rear elevational view of the outboard rear side of the housing of the restraint mechanism;

FIG. 28 is a cross sectional view taken along line 28-28 of FIG. 26;

FIG. 29 is a cross sectional view taken along line 29-29 of FIG. 26;

FIG. 32 is a cross sectional view taken along line 32-32 of FIG. 30;

FIG. 33 is a cross sectional view taken along line 33-33 of FIG. 30;

FIG. 34 is a cross sectional view taken along line 34-34 of FIG. 30;

FIG. 35 is a perspective view of a cam assembly of the restraint mechanism;

FIG. 36 is a front elevational view of a cam assembly of the restraint mechanism;

FIG. 37 is a side elevational view of a cam assembly of the restraint mechanism;

FIG. 38 is a side elevational view of the actuator shaft of the restraint mechanism;

FIG. 39 is an end view of the actuator shaft taken along line 39-39 of FIG. 38;

FIG. 40 is a side elevational view of a pivot shaft of a cam assembly of the restraint mechanism;

FIG. 41 is an end view of a pivot shaft of a cam assembly taken along line 41-41 of FIG. 40;

FIG. 42 is a cross sectional view taken along line 42-42 of FIG. 40;

DETAILED DESCRIPTION

Figure 1:
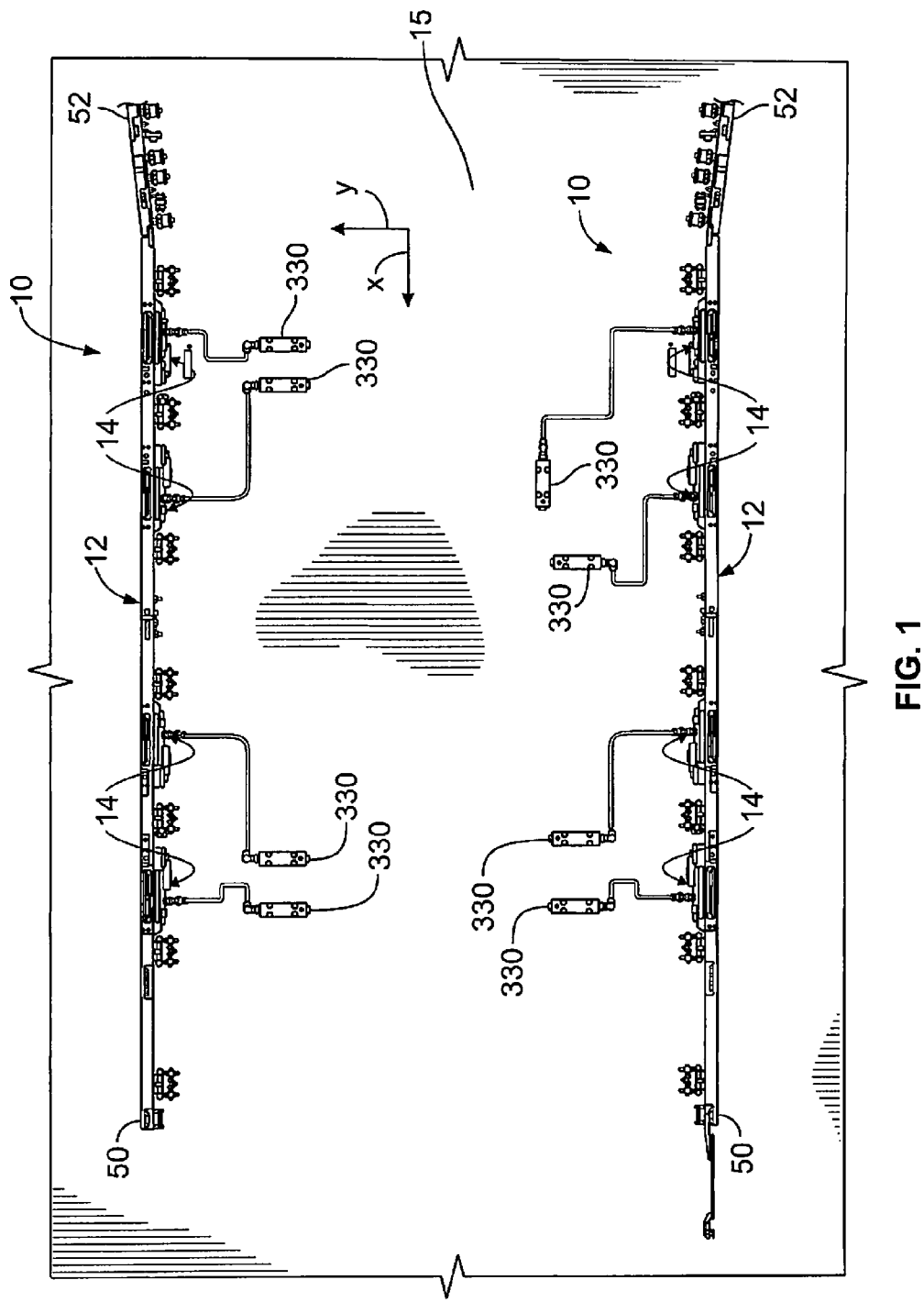
FIG. 1 is a top plan view of the restraint system having two generally parallel and opposing restraint assemblies mounted to the cargo floor of an aircraft, with each restraint assembly including a guide rail and a plurality of restraint mechanisms connected to the guide rail.

The present disclosure relates to a cargo restraint system for releasably restraining a unit load device or other cargo shipping device with respect to the cargo floor in a cargo bay of an aircraft. An embodiment of the restraint system is shown in the drawing figures as including two restraint assemblies 10. Each restraint assembly 10 includes a guide rail 12 and one or more restraint mechanisms 14 connected to guide rail 12. As shown in FIG. 1, two restraint assemblies 10 are coupled to the cargo floor 15, which may comprise a cargo ramp, of a cargo bay in an aircraft. The two restraint assemblies 10 are spaced apart and generally parallel to one another and are generally constructed as mirror images of one another. The restraint assemblies 10 extend generally parallel to the longitudinal axis, or x-axis, of the aircraft that extends generally from the tail to the nose of the aircraft. The transverse axis, or y-axis, of the aircraft is generally perpendicular to the x-axis and generally extends from wing tip to wing tip of the aircraft. The vertical axis, or z-axis, of the aircraft extends generally vertically and perpendicular to the x-axis and y-axis of the aircraft.

As shown in FIG. 1, a plurality of restraint mechanisms 14 are connected to each guide rail 12, with two of the restraint mechanisms 14 that are connected to a guide rail 12 being constructed as a mirror image of the other two restraint mechanisms 14 that are connected to the same guide rail 12. Guide rail 12 and restraint mechanisms 14 of restraint assembly 10 are adapted to releasably restrain a unit load device (ULD) such as a cargo container or cargo pallet and its associated cargo from movement along the x-axis, y-axis and z-axis with respect to the cargo floor 15 of the aircraft.

Figure 2:
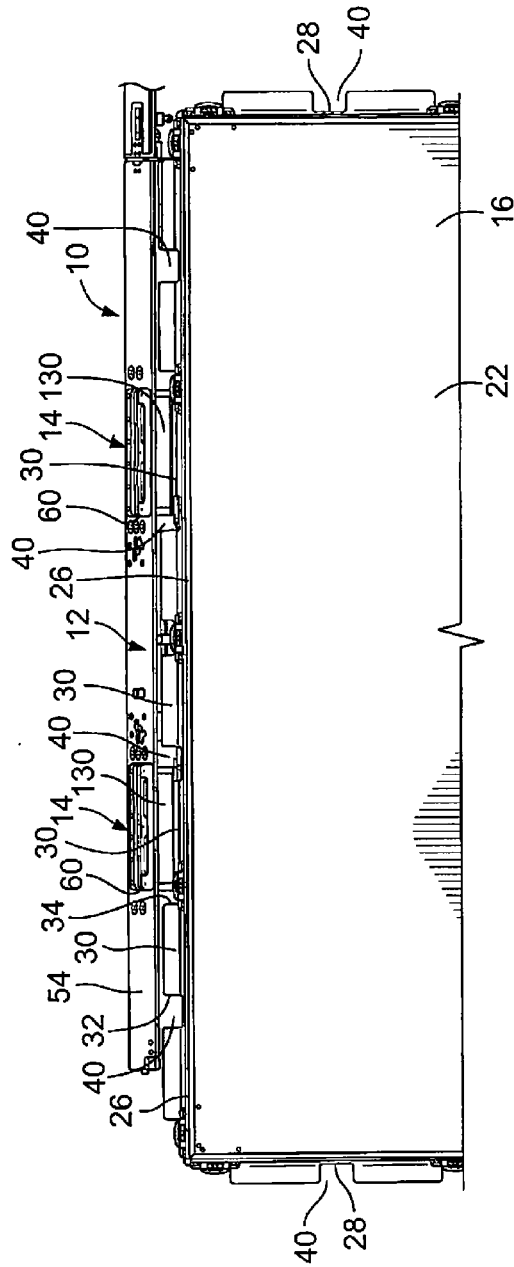
FIG. 2 is a partial top plan view showing a cargo pallet or similar transport surface associated with a cargo restraint assembly of the restraint system with the pawl of the cargo restraint mechanism in the locked position and adapted to engage the cargo pallet to restrain movement of the cargo pallet with respect to the cargo floor of the aircraft.
Figure 3:
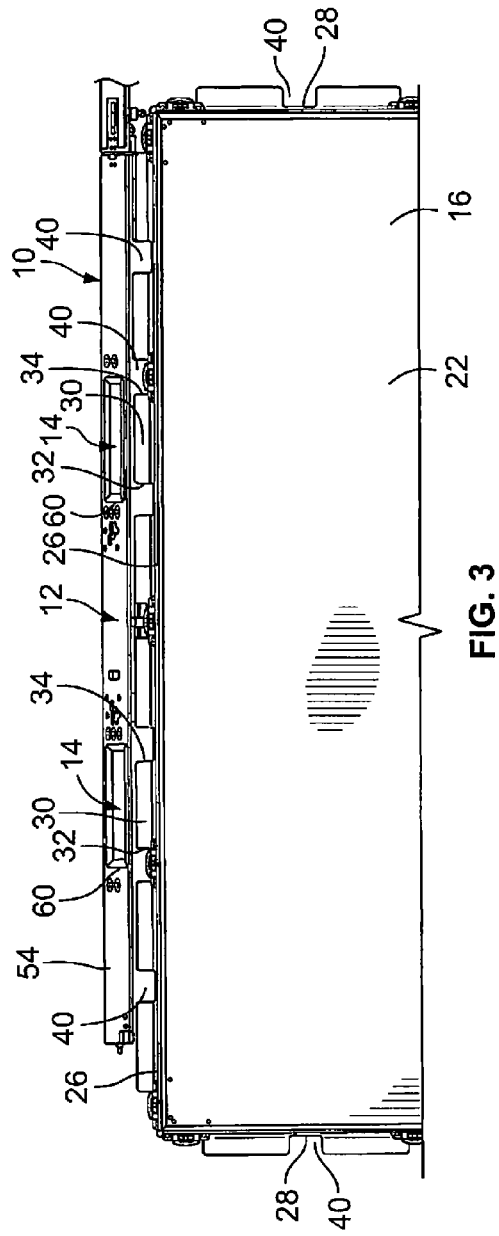
FIG. 3 is a partial top plan view showing a cargo pallet associated with cargo restraint assembly of the restraint system with the pawl of the cargo restraint mechanism in the unlocked position and disengaged from the cargo pallet to permit movement of the cargo pallet with respect to the cargo floor of the aircraft.
Figure 8:
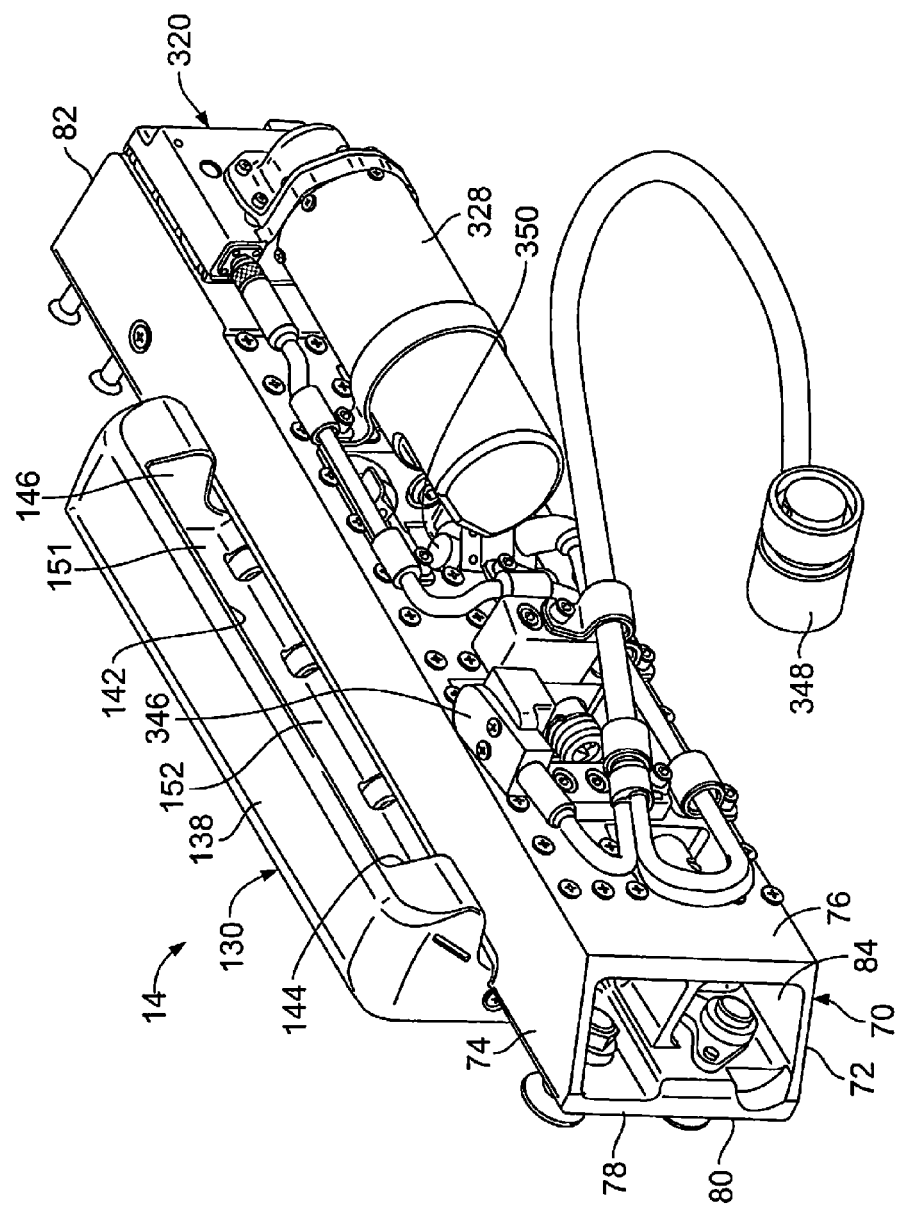
FIG. 8 is a perspective view of the restraint mechanism of the restraint assembly shown with the shear plate removed for purposes of illustration.
Figure 9:
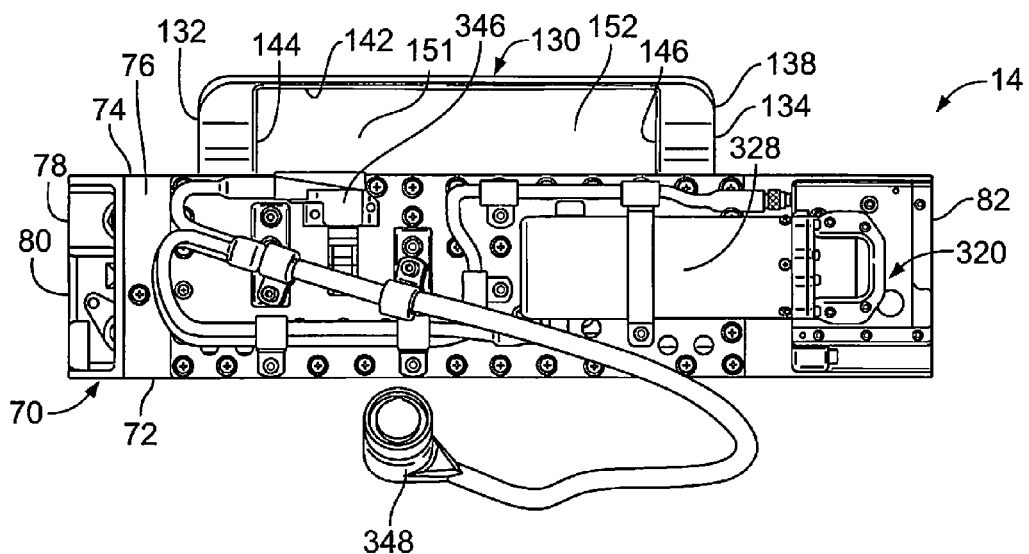
FIG. 9 is front elevational view of the cargo restraint mechanism shown with the pawl in the locked position.
Figure 10:
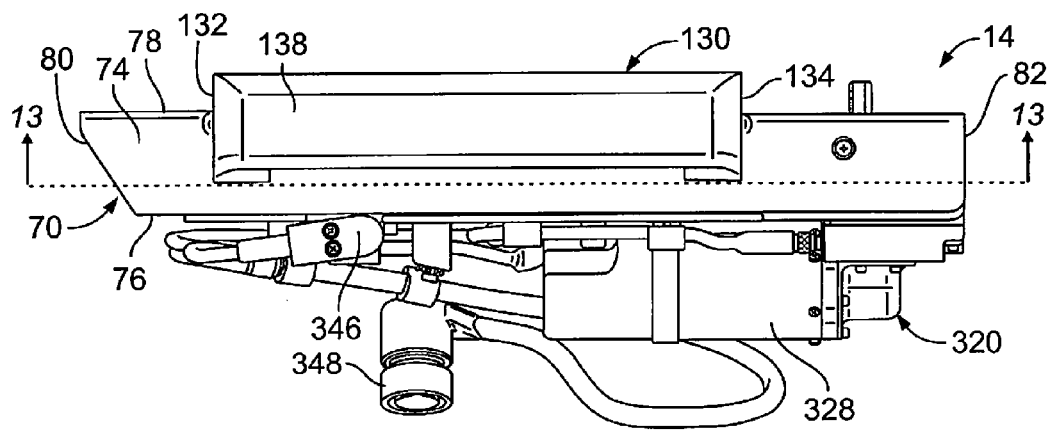
FIG. 10 is a top plan view of the cargo restraint mechanism shown with the pawl in the locked position.
Figure 11:
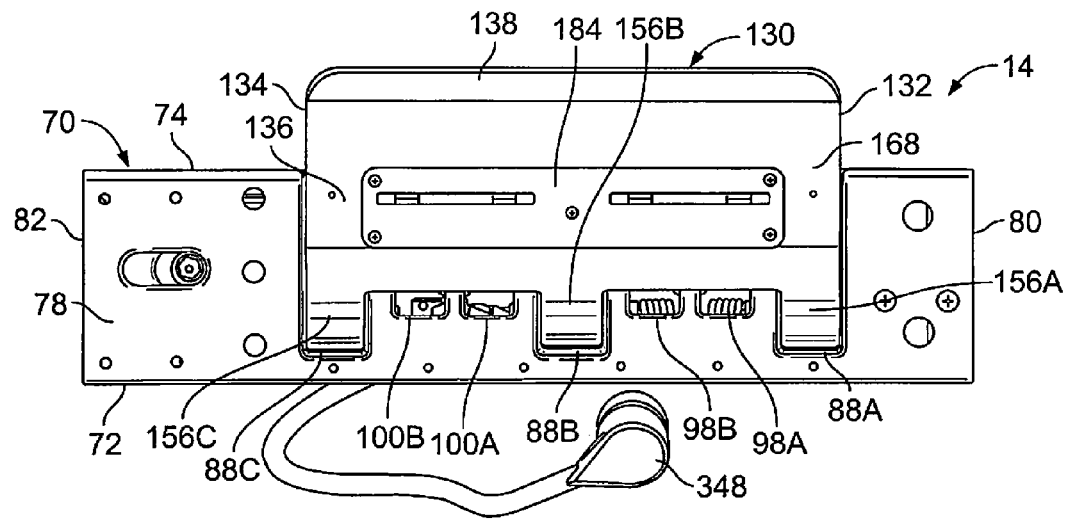
FIG. 11 is rear elevational view of the cargo restraint mechanism shown with the pawl in the locked position.
Figure 12:
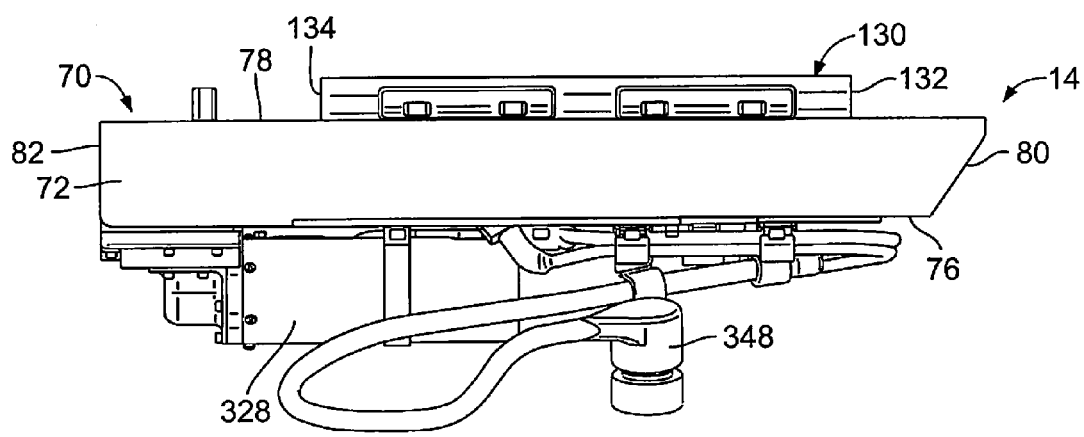
FIG. 12 is a bottom view of the cargo restraint mechanism shown with the pawl in the locked position.

A ULD, such as a cargo pallet 16, is shown in the drawing figures, such as in FIGS. 2 and 3. Pallet 16 includes a floor 18 having a generally planar bottom surface 20 and a spaced apart and generally parallel planar top surface 22. Top surface 22 supports cargo to be transported on pallet 16 and within the aircraft. Floor 18 includes a peripheral edge 24 that forms spaced apart and generally parallel side edges 26, and spaced apart and generally parallel end edges 28 that extend generally perpendicular between side edges 26. A plurality of tabs 30 extend outwardly from each side edge 26 and each end edge 28 of pallet 16. Each tab 30 extends between a first end 32 and a second end 34 generally parallel to its associated edge of floor 18. Each tab 30 extends outwardly from peripheral edge 24 of floor 18 to a generally linear outer edge 36. Each tab 30 includes a generally planar top surface 38 that extends between first end 32 and second end 34 and between peripheral edge 24 of floor 18 and outer edge 36. Adjacent tabs 30 are spaced apart from one another by a slot 40.

Each guide rail 12 is elongate and extends between a first end 50 and a second end 52. Guide rail 12 includes a generally planar wall 54 that extends from a bottom edge 56 to a top edge 58. Wall 54 includes a plurality of apertures 60 that are spaced apart from one another. Wall 54 includes a generally planar rear outboard surface 62. The inboard side of guide rail 12 is adapted engage outer edge 36 of tabs 30 of pallet 16 and thereby restrain movement of pallet 16 along the y-axis of the aircraft with respect to cargo floor 15.

Restraint mechanism 14 includes an elongate and generally rectangular housing 70. Housing 70 includes a generally planar bottom wall 72, and a generally planar top wall 74 spaced apart from and generally parallel to bottom wall 72. Housing 70 also includes a generally planar inboard front wall 76 and a spaced apart and generally parallel and planar outboard rear wall 78. Housing 70 extends between a first end 80 and a second end 82. Housing 70 includes an open-end chamber 84 at first end 80 and an open-end chamber 86 at second end 82. Housing 70 includes one or more pawl chambers, such as pawl chambers 88A-C, that are spaced apart from one another along the longitudinal axis of housing 70 and between end chamber 84 and end chamber 86. Front wall 76 of housing 70 includes front pawl apertures 90A-C, each of which is in communication with a respective pawl chamber 88A-C. Rear wall 78 of housing 70 includes rear pawl apertures 92A-C, each of which is in communication with a respective pawl chamber 88A-C.

Housing 70 also includes one or more cam chambers, such as cam chambers 94A-B that are spaced apart from one another along the longitudinal axis of housing 70. Cam chamber 94A is located between pawl chambers 88A and 88B. Cam chamber 94B is located between pawl chambers 88B and 88C. Front wall 76 of housing 70 includes a front cam aperture 96A in communication with cam chamber 94A and a front cam chamber 96B in communication with cam chamber 94B. Rear wall 78 of housing 70 includes rear cam apertures 98A and 98B in communication with cam chamber 94A. Rear wall 78 of housing 70 includes rear cam apertures 100A and 100B in communication with cam chamber 94B. Rear cam apertures 98A-B and 100A-B are spaced apart from one another along the longitudinal axis of housing 70. Front cam aperture 96A is located between front pawl apertures 90A and 90B. Front cam aperture 96B is located between front pawl apertures 90B and 90C. Rear cam apertures 98A-B are located between rear pawl apertures 92A and 92B. Rear cam apertures 100A-B are located between rear pawl apertures 92B and 92C.

Housing 70 includes a transverse wall 102A located between end chamber 84 and pawl chamber 88A, a transverse wall 102B located between pawl chamber 88A and cam chamber 94A, a transverse wall 102C located between cam chamber 94A and pawl chamber 88B, a transverse wall 102D between located pawl chamber 88B and cam chamber 94B, a transverse wall 102E located between cam chamber 94B and pawl chamber 88C, and a transverse wall 102F located between pawl chamber 88C and end chamber 86. Transverse walls 102A-F extend generally transversely to the longitudinal axis of housing 70 and front wall 76 and rear wall 78, and are generally parallel to one another.

Transverse wall 102A includes a bore 104A extending between and in communication with end chamber 84 and pawl chamber 88A. Transverse wall 102B includes a bore 104B that extends between and in communication with pawl chamber 88A and cam chamber 94A. Transverse wall 102C includes a bore 104C that extends between and in communication with cam chamber 94A and pawl chamber 88B. Transverse wall 102D includes a bore 104D that extends between and in communication with pawl chamber 88B and cam chamber 94B. Transverse wall 102E includes a bore 104E that extends between and in communication with cam chamber 94B and pawl chamber 88C. Transverse wall 102F includes a bore 104F that extends between and in communication with pawl chamber 88C and end chamber 86. Bores 104A-F are generally cylindrical and are aligned with one another along a linear pivot axis 106 that extends generally parallel to the longitudinal axis of housing 70. Bores 104A-F extend concentrically about pivot axis 106.

Rear wall 78 of housing 70 includes a rib 108A located between rear cam apertures 98A and 98B and that extends inwardly into cam chamber 94A to an interior surface 110. Rear wall 78 includes a vertical rib 108B located between cam apertures 100A and 100B and that extends inwardly from rear wall 78 into cam chamber 94B to an interior surface 110. Ribs 108A and B are spaced apart and generally parallel to one another. Each rib 108A and 108B includes a generally concave notch 112 formed in interior surface 110.

Housing 70 includes a transverse wall 114A located between end chamber 84 and cam chamber 94A, a transverse wall 114B located between cam chamber 94A and cam chamber 94B, and a transverse wall 114C located between cam chamber 94B and end chamber 86. Transverse walls 114A-C extend downwardly from top wall 74 of housing 70. Transverse walls 102A-B extend downwardly from the bottom of transverse wall 114A, transverse walls 102C-D extend downwardly from the bottom of transverse wall 114B, and transverse walls 102E-F extend downwardly from transverse wall 114C. Transverse wall 114A includes a generally cylindrical bore 116A that extends between and in communication with end chamber 84 and cam chamber 94A. Transverse wall 114B includes a generally cylindrical bore 116B that extends between and in communication with cam chambers 94A and 94B. Transverse wall 114C includes a generally cylindrical bore 116C that extends between and in communication with cam chamber 94B and end chamber 86. Bores 116A-C are spaced apart and aligned with one another along a generally linear rotational axis 118 and are concentric about rotational axis 118. Ribs 108A and B each include a concavely curved notch 120 that is formed as a portion of an arc of a circle and that is aligned with bores 116A-C.

Restraint mechanism 14 includes a pawl 130 pivotally coupled to housing 70 for pivotal movement about pivot axis 106 with respect to housing 70. Pawl 130 is selectively pivotal about pivot axis 106 with respect to housing 70 between a locked position and an unlocked position. Pawl 130 extends longitudinally between a first end 132 and a second end 134. Pawl 130 includes a body 136 having a head 138 coupled to an upper end of body 136. Head 138 includes a top wall 140 having a bottom surface 142. Head 138 also includes a first side wall 144 located at first end 132 of pawl 130 and a second side wall 146 located at second end 134 of pawl 130. First side wall 144 includes a generally planar interior surface 148 and second side wall 146 includes a generally planar interior surface 150. First side wall 144 and second side wall 146 are spaced apart and generally parallel to one another and extend downwardly from top wall 140. Head 138 also includes a back wall 151 that extends downwardly from top wall 140 and between first side wall 144 and second side wall 146. Head 138 of pawl 130 includes a cavity 152 formed between first side wall 144 and second side wall 146, below top wall 140 and in front of back wall 151. Cavity 152 is adapted to receive and retain a tab 30 of pallet 16 when pawl 130 is in the locked position.

Pawl 130 includes one or more feet, such as feet 154A-C. Each foot 154A-C is attached to the bottom of body 136 by a respective leg 156A-C. Each leg 156A-C and its respective foot 154A-C are respectively spaced apart from one another and are generally parallel to one another. Each leg 156A-C extends generally downwardly and inwardly from the bottom end of body 136, and head 138 extends generally inwardly from an upper end of body 136, such that pawl 130 is generally C-shaped as shown in FIGS. 32-34. Foot 154A includes a generally cylindrical bore 158A, foot 154B includes a generally cylindrical bore 158B, and foot 154C includes a generally cylindrical bore 158C. Bores 158A-C are coaxially aligned with one another along pivot axis 106 and extend concentrically about pivot axis 106. Each foot 154A-C includes a radial bore 160 extending outwardly through the tip of each foot 154A-C and generally radially with respect to pivot axis 106. Each radial bore 160 is in communication with a respective bore 158A-C.

Pawl 130 includes a plurality of apertures, such as generally rectangular apertures 164A-D that extend from an inner surface 166 of body 136 to a generally planar exterior surface 168 of body 136. Apertures 164A and B are spaced apart and generally parallel to one another and are located between legs 156A and B. Apertures 164C and D are spaced apart and generally parallel to one another and are located between legs 156B and C. Exterior surface 168 of body 136 includes a shallow generally rectangular recess 170 that is in communication with apertures 164A-D. Body 136 of pawl 130 includes a web 172A located between apertures 164A and B, and a web 172B located between apertures 164C and D.

Pawl 130 includes a generally cylindrical bore 174A that extends inwardly from a first end 176A located at first end 132 of pawl 130 to a second end 178A located adjacent leg 156B. Pawl 130 includes a generally cylindrical bore 174B that extends from a first end 176A located at second end 134 of pawl 130 to a second end 178B located adjacent leg 156B. Bores 174A and B are spaced apart from one another and are coaxially aligned with one another and extend concentrically about a generally linear cam pivot axis 180. Bore 174A extends through and is located on both sides of aperture 164A and aperture 164B. Bore 174B extends through and is located on both sides of aperture 164C and aperture 164D. Cam pivot axis 180 is located generally parallel to and spaced apart from pivot axis 106. Inner surface 166 of body 136 includes a generally convexly curved ridge 182 that extends along bore 174A and bore 174B as shown in FIG. 33. A generally rectangular and planar cover plate 184 is located within recess 170 of pawl 130 and is removably coupled thereto with one or more fasteners such that the outer surface of cover plate 184 is generally coplanar with exterior surface 168 of body 136.

Figure 13:
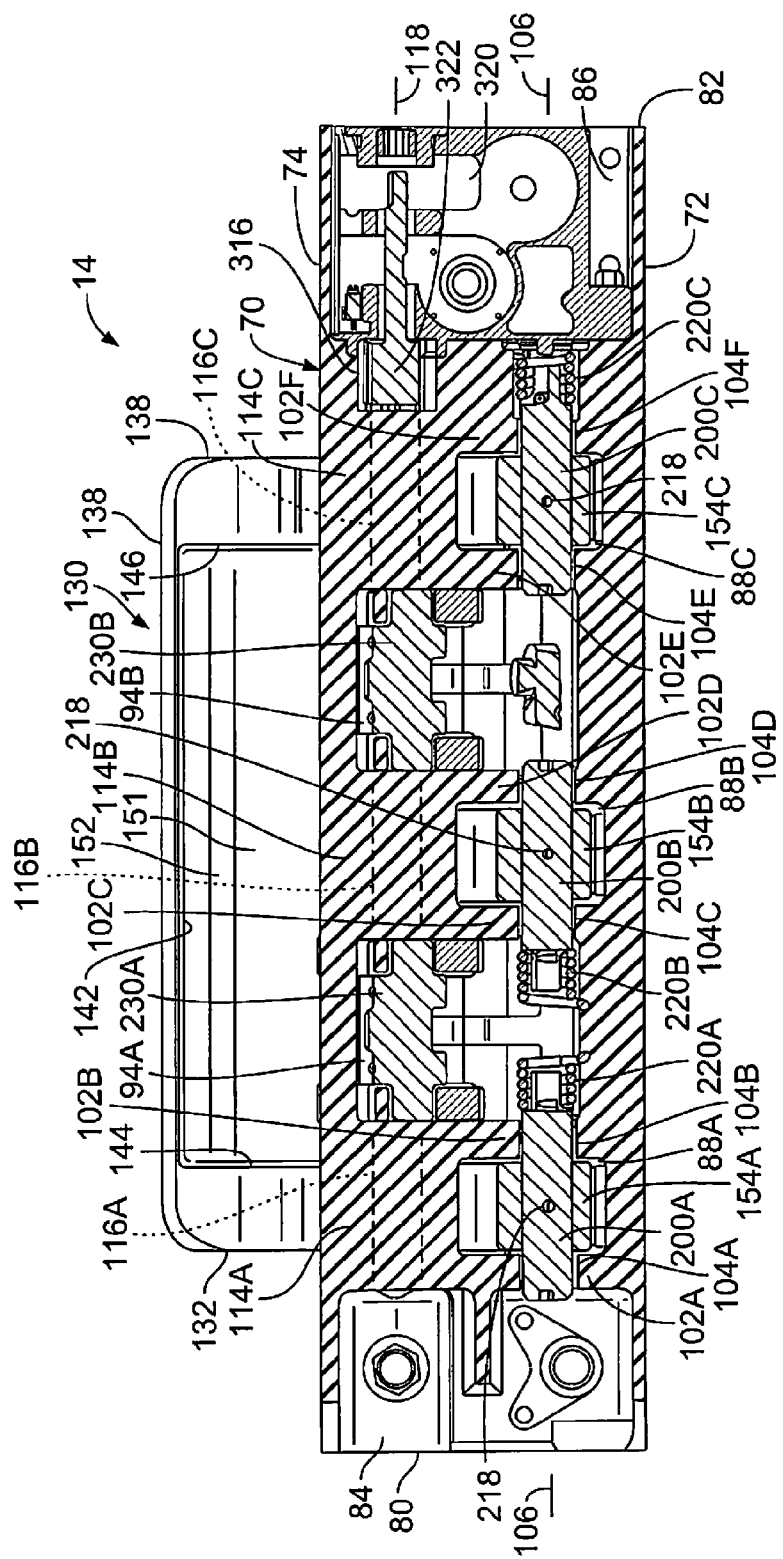
FIG. 13 is a cross sectional view taken along line 13-13 of FIG. 10.
Figure 16:
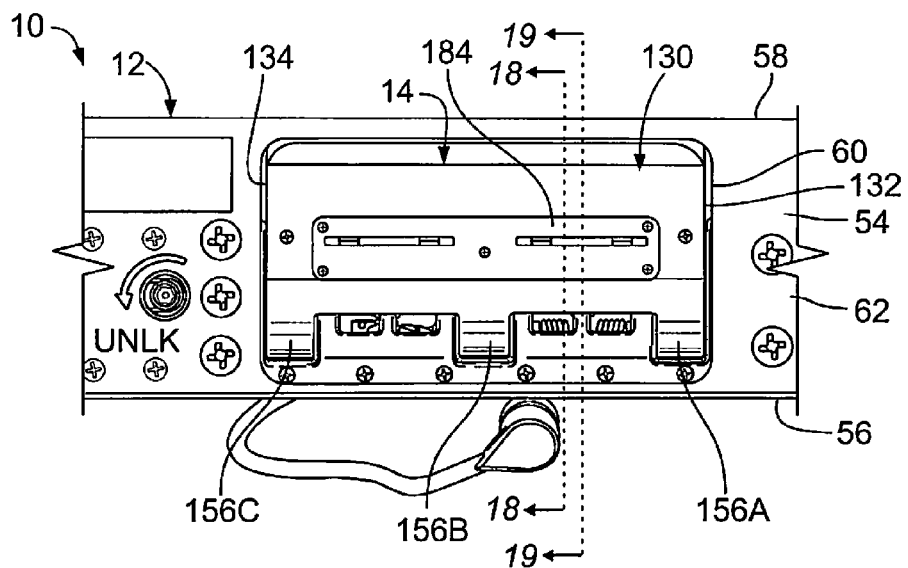
FIG. 16 is a partial rear view of the restraint assembly shown with the pawl of the restraint mechanism in the locked position.
Figure 17:
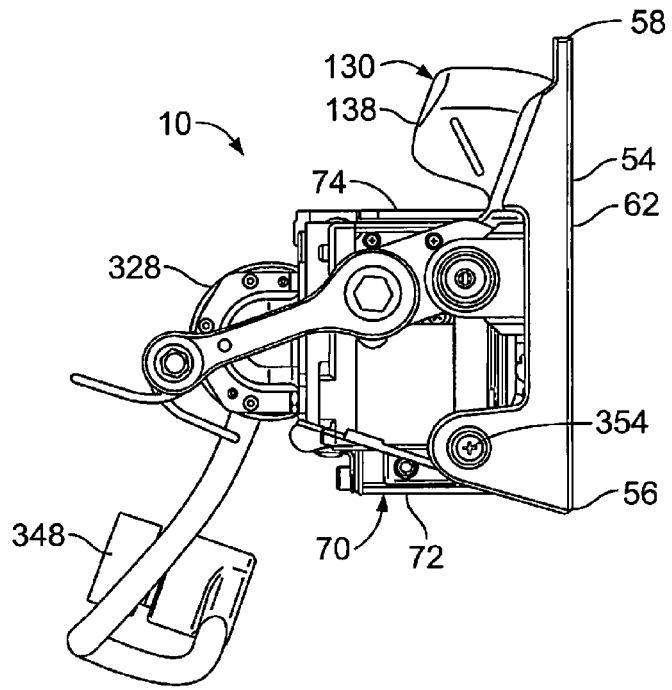
FIG. 17 is a side elevational view of the restraint assembly with the pawl of the restraint mechanism shown in the locked position.
Figure 20:
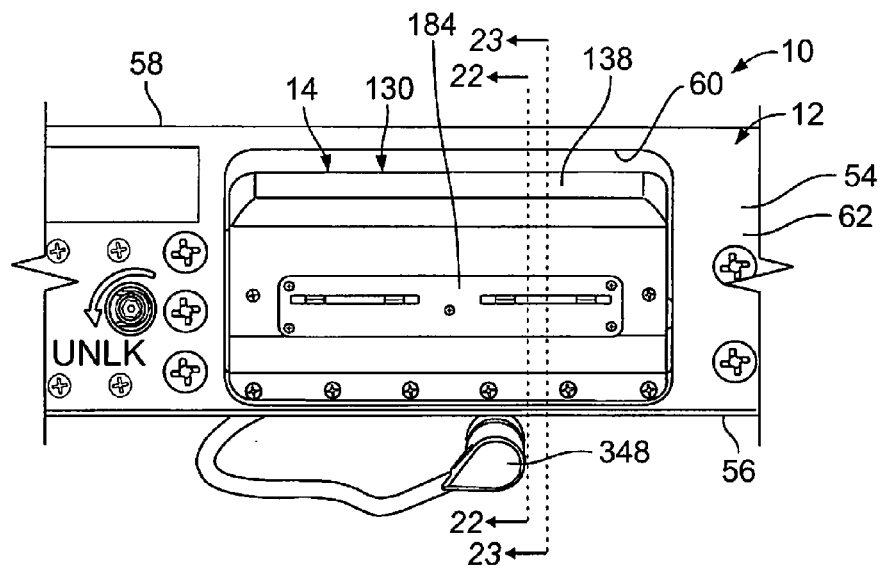
FIG. 20 is a partial rear view of the restraint assembly shown with the pawl of the restraint mechanism in the unlocked position.
Figure 21:
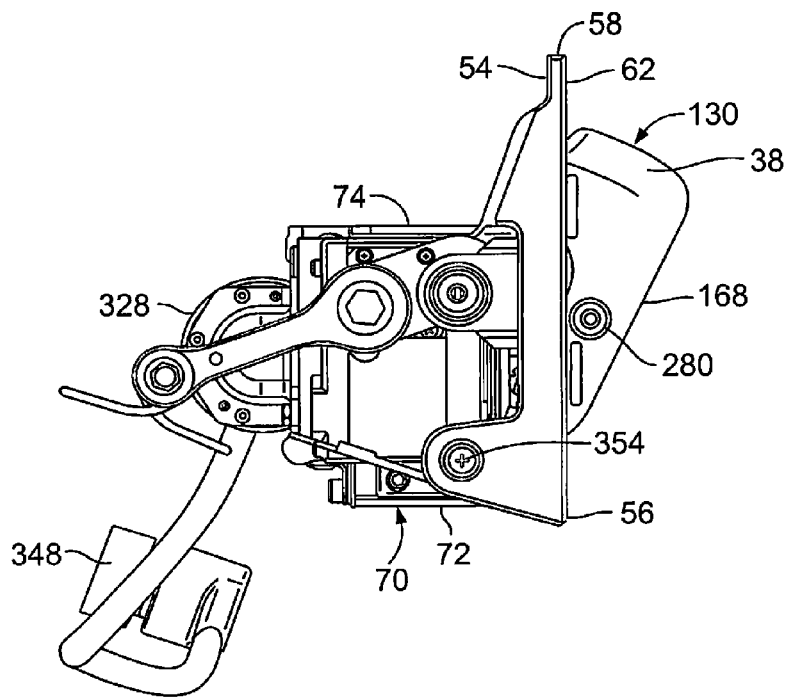
FIG. 21 is a side elevational view of the restraint assembly shown with the pawl of the restraint mechanism in the unlocked position.

Restraint mechanism 14 includes one or more connector members, such as pivot shafts 200A-C as shown in FIG. 13. As shown in FIG. 13, the orientation of pivot shafts 200A and C are reversed with respect to pivot shaft 200B. Each of pivot shafts 200A-C are constructed in the same manner. Pivot shaft 200B is shown in FIGS. 43-48. Pivot shaft 200B includes a first end 202 and a second end 204 and includes a generally cylindrical outer surface 206 that extends between first end 202 and second end 204 about and along pivot axis 106. Second end 204 of pivot shaft 200B includes a socket, such as a hexagonal socket 208 that extends inwardly into pivot shaft 200B along pivot axis 106. A generally cylindrical bore 210 extends generally diametrically through pivot shaft 200B and transversely through pivot axis 106. Bore 210 is located approximately midway between first end 202 and second end 204. Pivot shaft 200B includes a first finger 212 that extends outwardly from first end 202 generally parallel to pivot axis 106, and a second finger 214 that extends outwardly from first end 202 generally parallel to pivot axis 106. First and second fingers 212 and 214 extend outwardly from first end 202 of pivot shaft 200B generally parallel to one another and are spaced apart from one another by an open-end slot 216.

Pivot shaft 200A extends through bore 158A in foot 154A of pawl 130 and extends through bore 104A in transverse wall 102A and bore 104B in transverse wall 102B of housing 70 such that first end 204 of pivot shaft 200A is located in end chamber 84 and second end 202 of pivot shaft 200A is located cam chamber 94A. A fastener 218 extends through bore 210 of pivot shaft 200A and bore 160 of foot 154A such that pivot shaft 200A is fixedly coupled to pawl 130 for conjoint rotation with pawl 130 about pivot axis 106.

Pivot shaft 200B extends through bore 158B in foot 154B of pawl 130 and extends through bore 104C in transverse wall 102C and bore 104D in transverse wall 102D of housing 70 such that first end 204 of pivot shaft 200B is located in cam chamber 94B and second end 202 of pivot shaft 200B is located cam chamber 94A. A fastener 218 extends through bore 210 of pivot shaft 200B and bore 160 of foot 154B such that pivot shaft 200B is fixedly coupled to pawl 130 for conjoint rotation with pawl 130 about pivot axis 106.

Pivot shaft 200C extends through bore 158C in foot 154C of pawl 130 and extends through bore 104E in transverse wall 102E and bore 104F in transverse wall 102F of housing 70 such that first end 204 of pivot shaft 200C is located in cam chamber 94B and second end 202 of pivot shaft 200C is located in end chamber 86. A fastener 218 extends through bore 210 of pivot shaft 200C and bore 160 of foot 154C such that pivot shaft 200C is fixedly coupled to pawl 130 for conjoint rotation with pawl 130 about pivot axis 106. Pivot shafts 200A-C pivotally couple pawl 130 to housing 70 for pivotal movement of pawl 130 about pivot axis 106 with respect to housing 70 between the locked position of pawl 130 and the unlocked position of pawl 130.

Foot 154A of pawl 130 is located within pawl chamber 88A, foot 154B of pawl 130 is located within pawl chamber 88B, and foot 154C of pawl 130 is located within pawl chamber 88C. Leg 156A of pawl 130 extends outwardly from pawl chamber 88A through rear pawl aperture 90A. Leg 156B of pawl 130 extends outwardly from pawl chamber 88B through rear pawl aperture 92B. Leg 156C of pawl 130 extends outwardly from pawl chamber 88C through rear pawl aperture 92C of housing 70.

Figure 24:
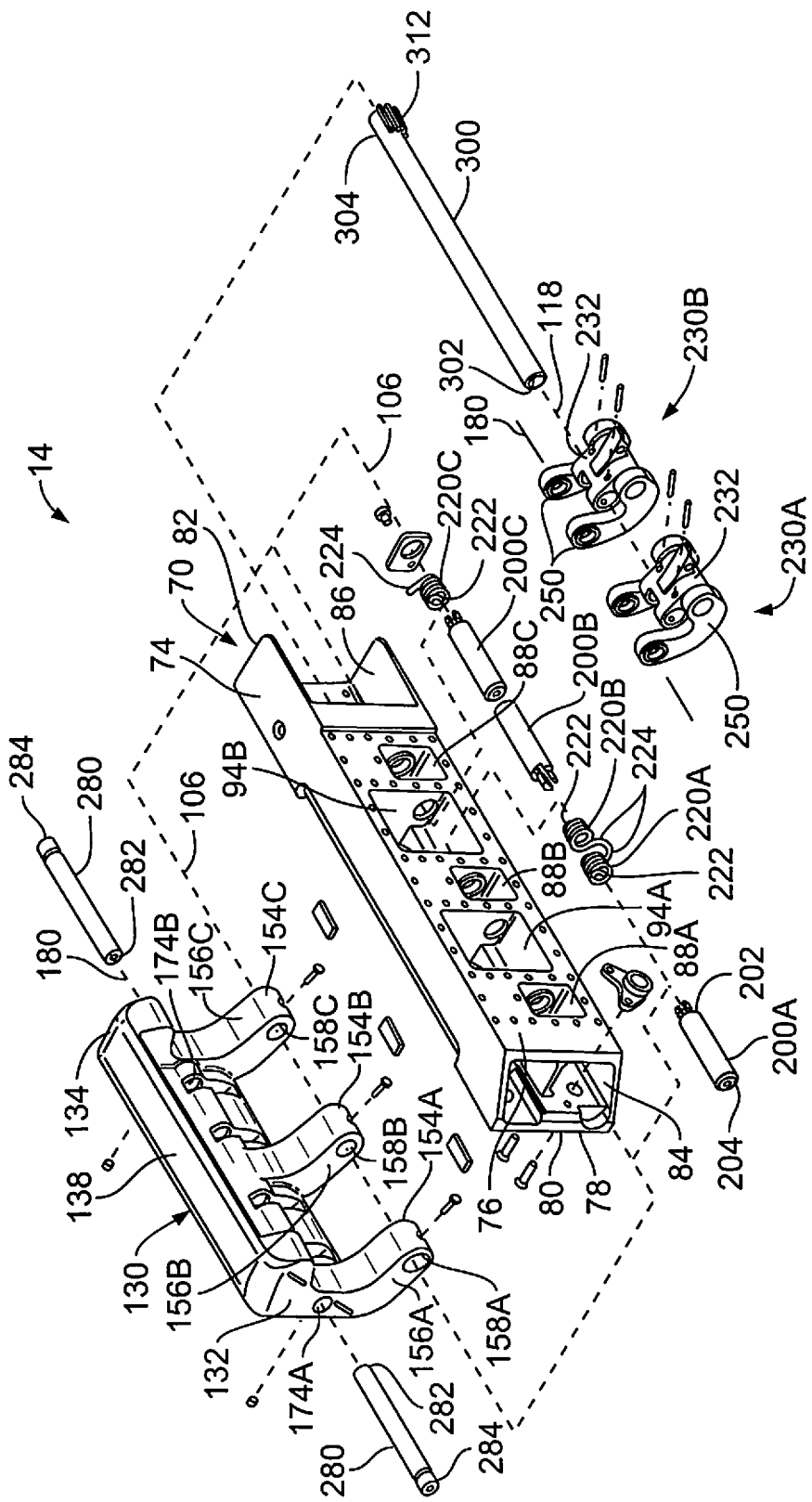
FIG. 24 is a partial exploded view of the restraint mechanism of the restraint assembly.
Figure 25:
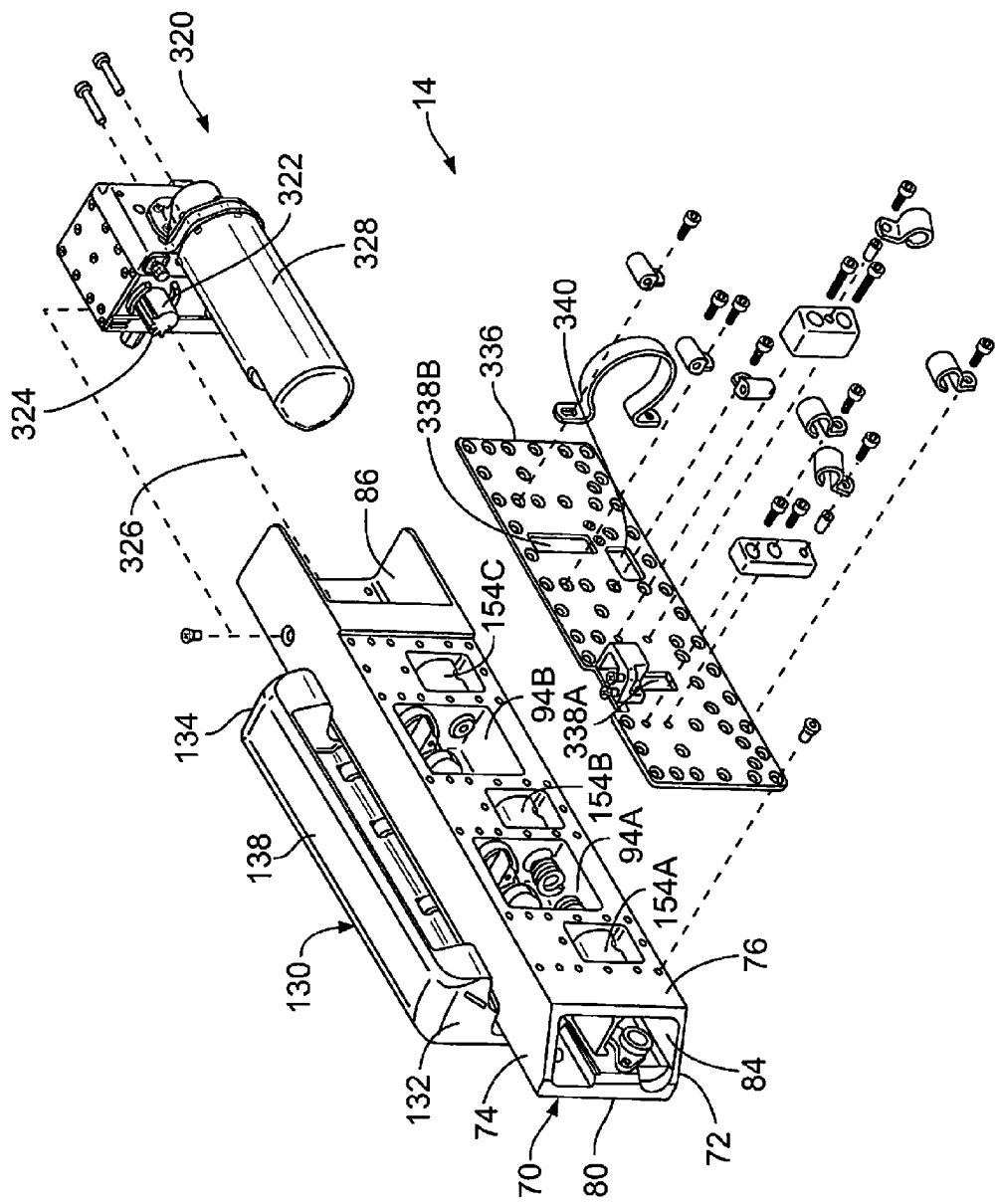
FIG. 25 is a partial exploded view of the restraint mechanism of the restraint assembly.
Figure 30:
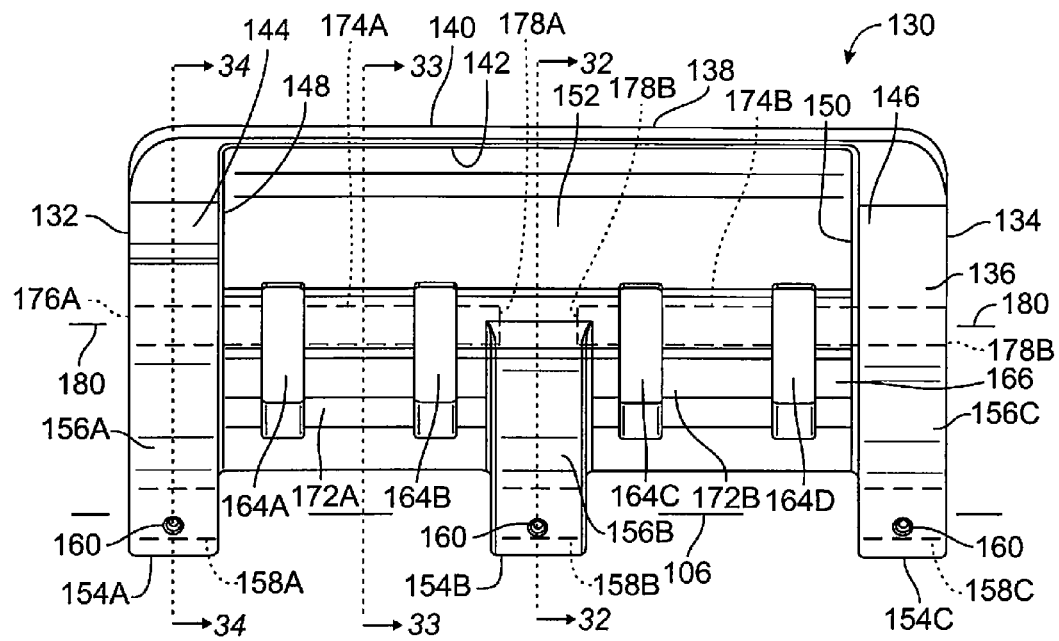
FIG. 30 is a front elevational view of the pawl of the restraint mechanism.
Figure 31:
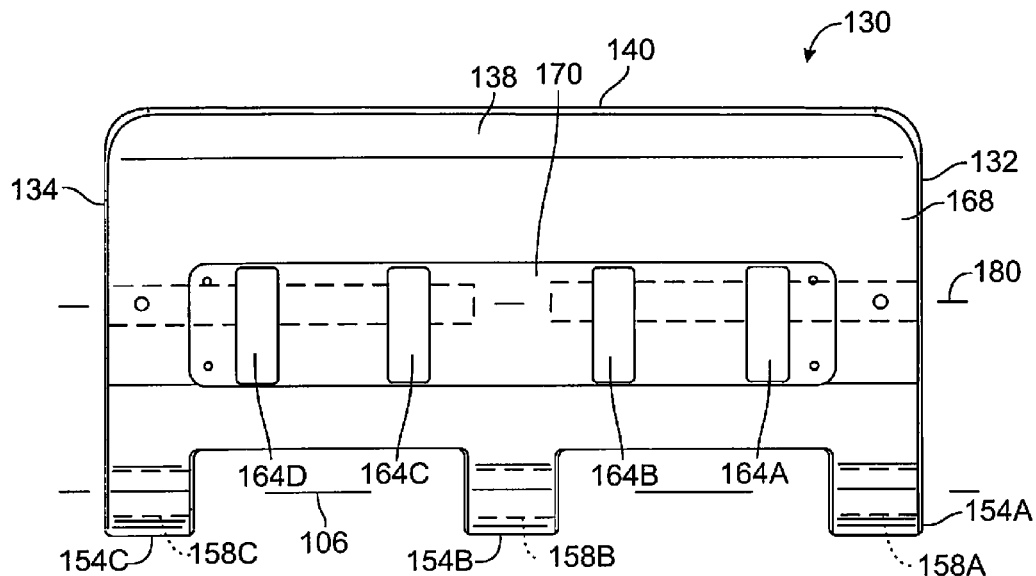
FIG. 31 is a rear elevational view of the pawl of the restraint mechanism.
Figure 45:
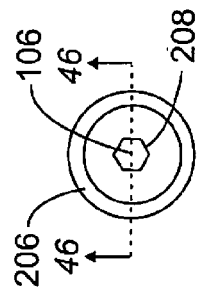
FIG. 45 is a right end view of a pivot shaft for the pawl of the restraint mechanism.
Figure 44:
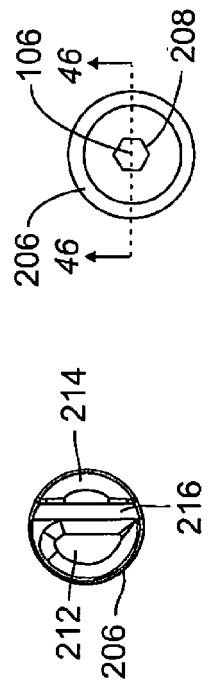
FIG. 44 is an end view of a pivot shaft for the pawl of the restraint mechanism.
Figure 43:
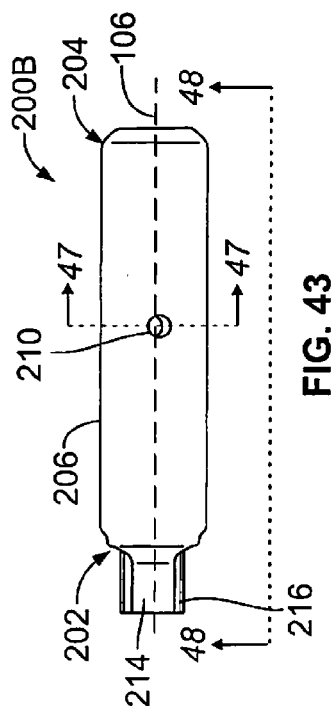
FIG. 43 is a side elevational view of a pivot shaft for the pawl of the restraint mechanism.
Figure 48:
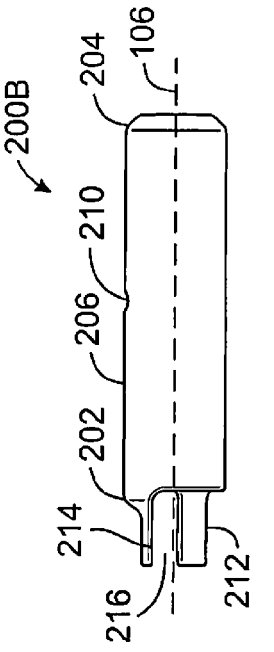
FIG. 48 is a bottom view of a pivot shaft for the pawl of the restraint mechanism taken along line 48-48 of FIG. 43.
Figure 47:
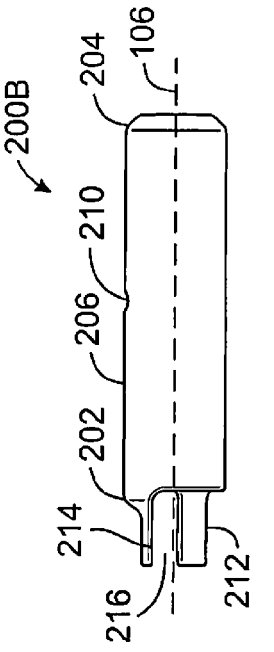
FIG. 47 is a cross sectional view taken along line 47-47 of FIG. 43.
Figure 46:
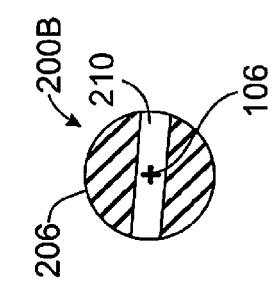
FIG. 46 is a partial cross sectional view of a pivot shaft for the pawl of the restraint mechanism taken along line 46-46 of FIG. 45.

Restraint mechanism 14 includes one or more resilient biasing members, such as resilient biasing members 220A-C. Each resilient biasing member 220A-C may comprise a resilient coil torsion spring. Biasing members 220A and B are located within cam chamber 94A. Biasing member 220C is located within bore 104F of transverse wall 102F. Each biasing member 220A-C includes a first engagement member 222 and a second engagement member 224 located at opposite ends of the biasing member. Second engagement members 224 of biasing members 220A and B may be joined together as shown in FIG. 24. Biasing member 220A extends around first finger 212 and second finger 214 of pivot shaft 200A with first engagement member 222 located within slot 216, such that first engagement member 222 of biasing member 220A and pivot shaft 200A are conjointly rotatable with one another about pivot axis 106. Second engagement member 224 of biasing member 220A is adapted to engage bottom wall of cam chamber 94B to prevent rotation of second engagement member 224 of biasing member 220A about pivot axis 106.

Biasing member 220B extends around first finger 212 and second finger 214 of pivot shaft 200B with first engagement member 222 located within slot 216 such that first engagement member 222 of biasing member 220B and pivot shaft 200B are conjointly rotatable with one another about pivot axis 106. Second engagement member 224 of biasing member 220B is adapted to engage bottom wall of cam chamber 94B to prevent rotation of second engagement member 224 of biasing member 220B about pivot axis 106.

Biasing member 220C extends around first finger 212 and second finger 214 of pivot shaft 200A with first engagement member 222 located within slot 216 such that first engagement member 222 of biasing member 220C and pivot shaft 200C are conjointly rotatable with one another about pivot axis 106. Second engagement member 224 of biasing member 220C is adapted to engage a retainer member in end chamber 86 of biasing member 220C to prevent rotation of second engagement member 224 about pivot axis 106. Biasing members 220A-C resiliently bias pawl 130 to pivot from the unlocked position of pawl 130 toward the locked position of pawl 130 about pivot axis 106 with respect to housing 70.

Restraint mechanism 14 includes one or more cam assemblies, such as cam assemblies 230A and B. Cam assembly 230A is shown in FIGS. 35-37. Cam assembly 230B is constructed in the same manner as cam assembly 230A. Cam assembly 230A includes a first link 232 having a first end 234 and a second end 236. First end 234 of first link 232 includes spaced apart ears 238A and B. Each ear 238A and B includes a generally cylindrical bore 240. Bores 240 are coaxially aligned with one another and extend concentrically about and along rotational axis 118. Transverse bores 242 extend through first end 234 of first link 232 and perspectively through each ear 238A and B generally transverse to rotational axis 118 and diametrically through bores 240. Second end 236 of first link 232 includes a generally cylindrical bore 244 that extends from a first side to a second side of first link 232 concentrically about and along a generally linear cam pivot axis 246. Cam pivot axis 246 is generally parallel to rotational axis 118 and cam pivot axis 180. First link 232 includes an engagement member 248 that extends outwardly from second end 236 generally transverse to cam pivot axis 246.

Cam assembly 230A includes two second links 250, within each second link 250 located on a respective side of first link 232. Each second link 250 extends between a first end 252 and a second end 254. First end 252 of each second link 250 includes a generally cylindrical bore 256 that is aligned coaxially with bore 244 of first link 232 and that extends concentrically about and along cam pivot axis 246. An elongate and generally cylindrical shaft 258 extends through bores 256 of second links 250 and bore 240 of first link 232 and pivotally couples first link 232 to second links 250. First link 232 is pivotal with respect to second links 250 about cam pivot axis 246. Second end 254 of each second link 250 includes a generally cylindrical bore 260 that extends generally concentrically about and along cam pivot axis 180. Bores 260 of second links 250 are coaxially aligned with one another along cam pivot axis 180. Each second link 250 is generally C-shaped and includes a concave recess 262 between first and second ends 252 and 254 as shown in FIG. 37.

Restraint mechanism 14 includes one or more connector members, such as elongate and generally cylindrical shafts 280. Each shaft 280 extends between a first end 282 and a second end 284. Shaft 280 includes a generally cylindrical surface 286 that extends from first end 282 to second end 284. Shaft 280 includes a central longitudinal axis that is coaxially aligned with cam pivot axis 180. Shaft 280 includes an annular groove 288 formed in surface 286 that extends concentrically about cam pivot axis 180. First end 282 of shaft 280 includes a generally cylindrical recess 290 that extends inwardly into shaft 280 from first end 282 along cam pivot axis 180. Second end 284 of shaft 280 includes a generally cylindrical recess 292 that extends inwardly from second end 284 generally concentrically along cam pivot axis 180. Second end 284 of shaft 280 also includes a generally linear slot 294 that extends diametrically across shaft 280 and through recess 292.

Cam assembly 230A is located within cam chamber 94A. Shaft 280 extends through bores 260 in second ends 254 of second links 250 of cam assembly 230A and is located within bore 174A of pawl 130. Shaft 280 pivotally couples second links 250 of cam assembly 230A to pawl 130 such that second links 250 are pivotal with respect to pawl 130 about pawl pivot axis 180.

Cam assembly 230B is located within cam chamber 94B. Shaft 280 extends through bores 260 in second ends 254 of second links 250 of cam assembly 230B and is located within bore 174B of pawl 130. Shaft 280 pivotally couples second links 250 of cam assembly 230B to pawl 130 such that second links 250 are pivotal with respect to pawl 130 about pawl pivot axis 180. Cam assemblies 230A and B are selectively moveable between a locked position and an unlocked position.

Restraint mechanism 14 includes an elongate actuator shaft 300 as shown in FIGS. 38 and 39. Actuator shaft 300 extends generally linearly between a first end 302 and a second end 304 along and concentrically about rotational axis 118. Actuator shaft 300 includes a generally cylindrical outer surface 306. Actuator shaft 300 includes a pair of cylindrical bores 308 that are spaced apart and generally parallel to one another and that extend generally diametrically through actuator shaft 300. Bores 308 are adapted to align with respective bores 242 in first link 232 of cam assembly 230A. Actuator shaft 300 also includes two generally cylindrical bores 310 that are spaced apart and generally parallel to one another and that extend generally diametrically through actuator shaft 300. Bores 310 are adapted to align with respective transverse bores 242 of first link 232 of cam assembly 230B. Second end 304 of actuator shaft 300 includes a gear 312 having a plurality of outwardly extending teeth 314. Teeth 314 are spaced apart from one another and are located partially around outer surface 306.

Actuator shaft 300 extends through bores 116A-C of housing 70, through bores 240 of first link 232 of cam assembly 230A, and through bores 240 of first link 234 of cam assembly 230B. Second end 304 and gear 312 of actuator shaft 300 are located within a pocket 316 of housing 70 that is in communication with end chamber 86 of housing 70. Actuator shaft 300 is selectively rotatable or pivotal about rotational axis 118 with respect to housing 70. Actuator shaft 300 extends through bores 240 in first end 234 of first link 232 of cam assembly 230A and is fixedly coupled to first end 234 of cam assembly 230A by fasteners that extend through transverse bores 242 of first link 232 and bores 308 of actuator shaft 300. Actuator shaft 300 extends through bores 240 of first link 232 of cam assembly 230B and is fixedly coupled to first end 234 of second cam assembly 230B by fasteners that extend through bores 242 of first link 232 of cam assembly 230B and through bores 310 of actuator shaft 300. First link 232 of cam assembly 230A and first link 232 of cam assembly 230B are fixedly coupled to actuator shaft 300 for conjoint rotation with actuator shaft 300 about rotational axis 118 with respect to housing 70.

Restraint mechanism 14 includes an actuator 320 coupled to housing 70 that is partially located within end chamber 86 of housing 70. Actuator 320 includes a rotatable pinion 322 having a plurality of teeth 324 located partially around the circumference of pinion 322. Pinion 322 is located within pocket 316 of end chamber 86 of housing 70 and teeth 324 of pinion 322 are in meshing engagement with teeth 314 of gear 312 of actuator shaft 300. Pinion 322 and teeth 324 are selectively rotatable about a central longitudinal drive axis 326 of pinion 322 that is generally parallel to and spaced apart from rotational axis 118 of actuator shaft 300. Actuator 320 includes an electric drive motor 328 that is coupled in driving engagement to pinion 322 to provide selective rotation of pinion 322 about drive axis 326 in either a first rotational direction about drive axis 326, or an opposite second rotational direction about drive axis 326. As shown in FIG. 1, actuator 320 is electrically coupled to a controller 330. Controller 330 may be electrically coupled to the cargo control system in the cockpit of the aircraft and/or load master work station in the aircraft that controls the operation of restraint mechanisms 14 and restraint assemblies 10.

Restraint mechanism 14 includes a generally planar shear plate 336 removably coupled to front wall 76 of housing 70. Shear plate 336 reinforces and stiffens housing 70. Shear plate 336 is removable from housing 70 to provide access to pawl chambers 88A-C and cam chambers 94A-B. Shear plate 336 includes spaced apart and generally parallel rectangular apertures 338A-B. Aperture 338A is aligned with engagement member 248 of first link 232 of cam assembly 230A such that engagement member 248 of cam assembly 230A will extend through aperture 338A when cam assembly 230A and pawl 130 are in the locked position. Aperture 338B of shear plate 336 is aligned with engagement member 248 of first link 232 of cam assembly 230B, such that engagement member 248 of cam assembly 230B will extend through aperture 338B of shear plate 336 when cam assembly 230B and pawl 130 are in the locked position. Shear plate 336 also includes a generally rectangular aperture 340 located adjacent aperture 338B.

Restraint mechanism 14 includes a first proximity sensor 346 coupled to shear plate 336 and housing 70 that is electrically coupled to an electrical connector 348, such as a power-signal cable harness. Electrical connector 348 is adapted to be electrically connected to controller 330. Restraint mechanism 14 also includes a second proximity sensor 350 coupled to shear plate 336 and housing 70 adjacent aperture 338B and that is located within cam chamber 94B. Second proximity sensor 350 is electrically coupled to electrical connector 348 and thereby to controller 330. Drive motor 328 of actuator 320 is also electrically connected to electrical connector 348 and thereby to controller 330.

Pawl 130 of restraint mechanism 14 is shown in the unlocked position in FIGS. 6, 7, 22 and 23 with respect to housing 70 and guide rail 12. When pawl 130 is in the unlocked position, pawl 130 extends outwardly from pawl chambers 88A-C and housing 70 through rear pawl apertures 92A-C and through an aperture 60 in wall 54 of guide rail 12, such that head 138 of pawl 130 is located at least partially outboard of guide rail 12. When pawl 130 is in the unlocked position, head 138 of pawl 130 is disengaged from tabs 30 of pallet 16 and is transversely spaced apart from tabs 30. Pawl 130 is thereby disengaged from pallet 16. Pallet 16 and its cargo may therefore be moved longitudinally along the cargo floor 15 of the cargo bay of the aircraft parallel to the x-axis and laterally with respect to the y-axis and may be moved vertically with respect to the cargo floor 15 generally parallel to the z-axis of the aircraft. Guide rail 12 is adapted to restrain movement of pallet 16 transversely with respect to cargo floor 15 along the y-axis of the aircraft, such that pallet 16 is restrained to a limited transverse movement between the two opposing and spaced apart guide rails 12, when pawl 130 is in the locked position or the unlocked position. When pawl 130 is in its unlocked position, cam assemblies 230A and B are in their unlocked positions, such as shown in FIG. 22. Actuator shaft 300 is located outside of recess 262 of second links 250 of cam assemblies 230A and B when pawl 130 and cam assemblies 230A and B are in their unlocked positions.

Pawl 130 is pivoted from its unlocked position toward its locked position by actuation of drive motor 328 of actuator 320. Drive motor 328 rotates pinion 322 about drive axis 326, and pinion 322 rotates actuator shaft 300 about rotational axis 118 in a first rotational direction about rotational axis 118, such as a counter-clockwise direction about rotational axis 118 as viewed in FIG. 22. Rotation of actuator shaft 300 about rotational axis 118 conjointly rotates first links 232 of cam assemblies 230A and B about rotational axis 118 in the first rotational direction. Rotational movement of first links 232 of cam assemblies 230A and B moves first ends 252 of second links 250 of cam assemblies 230A and B toward front wall 76 of housing 70 and toward shear plate 336, and second links 250 of cam assemblies 230A and B pull shafts 280 toward rear wall 78 of housing 70, thereby pivoting pawl 130 about pivot axis 106 with respect to housing 70 toward housing 70.

When pawl 130 is pivoted from the unlocked position toward the locked position, first links 232 of cam assemblies 230A and B rotate in the first rotational direction about rotational axis 118. When pawl 130 reaches the locked position of pawl 130, engagement member 248 of first link 232 of cam assembly 230A engages first proximity sensor 346. First proximity sensor 346 then sends a signal to the cargo control system indicating that pawl 130 is in the locked position. Drive motor 328 of actuator 320 is then deactivated.

Pawl 130 is shown in the locked position in FIGS. 4, 5, 18 and 19. As shown in FIGS. 4 and 5, when pawl 130 is in the locked position, a tab 30 of pallet 16 is located within cavity 152 of head 138 of pawl 130. Bottom surface 142 of head 138 of pawl 130 is adapted to engage top surface 38 of tab 30 of pallet 16 to thereby restrain movement of pallet 16 in a vertical direction with respect to the cargo floor 15 along the z-axis. Tab 30 of pallet 16 is also located between first side wall 144 and second side wall 146 of head 138, such that first and second side walls 144 and 146 are adapted to engage first and second ends 32 and 34 of tab 30 and thereby restrain pallet 16 from forward and rearward movement with respect to cargo floor 15 along the x-axis of the aircraft.

As shown in FIG. 18, when pawl 130 is in its locked position, cam assemblies 230A and B are also in their locked positions. When cam assemblies 230A and B are in the locked position, actuator shaft 300 is located within recesses 262 of second links 250 of cam assemblies 230A and B, in a generally over-center arrangement, between shafts 280 and shafts 258 of cam assemblies 230A and B. Rotational axis 118 is generally aligned coplanar with cam pivot axis 180 and cam pivot axis 246. Cam assemblies 230A and B are thereby adapted to prevent unintended pivotal movement of pawl 130 from its locked position toward its unlocked position of pawl 130 when cam assemblies 230A and B are in their locked positions. When pawl 130 is in the locked position, pawl 130 does not project outwardly through aperture 60 of guide rail 12 beyond exterior surface 62 of wall 54 of guide rail 12. Exterior surface 168 of pawl 130 is located generally coplanar with exterior surface 62 of wall 54 of guide rail 12 and pawl 130 is located within aperture 60 of guide rail 12 when pawl 130 is in the locked position.

When it is desired to pivot pawl 130 from its locked position towards its unlocked position, drive motor 328 of actuator 320 is activated to rotate pinion 322 about drive axis 326 to thereby rotate actuator shaft 300 about rotational axis 118 in a second rotational direction, which is opposite the first rotational direction, and which is generally in a clockwise direction as viewed in FIG. 18. Rotation of actuator shaft 300 in the second rotational direction about rotational axis 118 conjointly rotates first links 232 of cam assemblies 230A and B in the second rotational direction about rotational axis 118. Rotation of first links 232 of cam assemblies 230A and B in the second rotational direction about rotational axis 118 moves shafts 258 and second links 250 of cam assemblies 230A and B away from front wall 76 of housing 70 and shear plate 336, whereby cam assemblies 230A and B pivot pawl 130 about pivot axis 106 with respect to housing 70 toward the unlocked position of pawl 130 and away from housing 70. Head 138 of pawl 130 moves in an inboard direction when pawl 130 is pivoted toward its locked position, and moves in an outboard direction when pawl 130 is pivoted toward its unlocked position.

Figure 49:
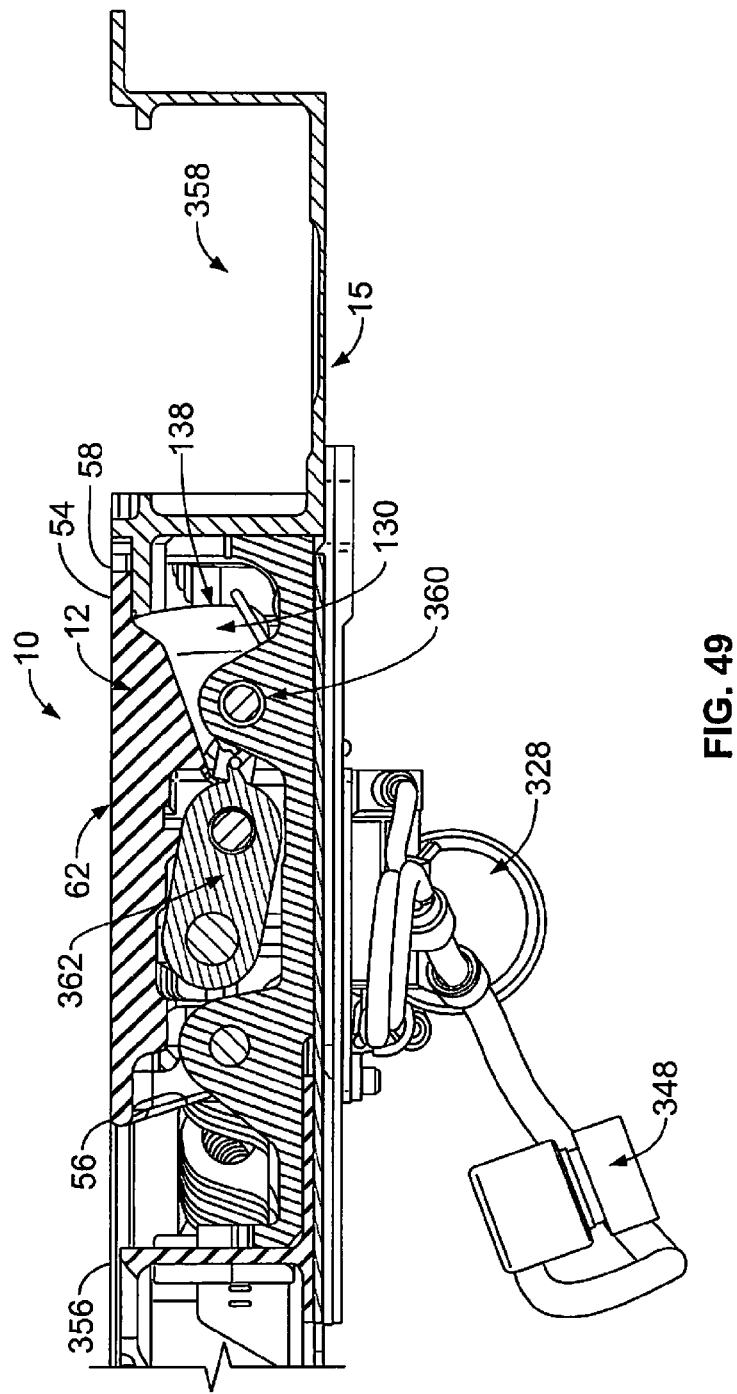
FIG. 49 is a partial cross sectional view showing the restraint assembly in the stowed position in association with the cargo floor of the aircraft and with the pawl of the restraint mechanism in the locked position.

Guide rail 12 and restraint mechanism 14 of restraint assembly 10 are shown in an extended operational or deployed position in FIGS. 1-7. When pawls 130 of restraint mechanisms 14 are in their locked positions with respect to their respective housings 70, guide rail 12 and restraint mechanisms 14 attached thereto may be pivoted about a pivot axis 354 of guide rail 12 from the deployed position to a retracted stowed position wherein the exterior surface 62 of wall 54 of guide rail 12 and exterior surface 168 of pawl 130 are generally coplanar with the surface 356 of cargo floor 15 of the cargo bay of the aircraft as shown in FIG. 49. Cargo floor 15 may include a floor pocket 358 and an attachment hinge 360. Guide rail 12 includes a stow link 362 enabling pivotal movement of guide rail 12 between the stowed and deployed positions. Restraint assembly 10 may be selectively pivoted between the deployed position and the stowed position about pivot axis 354 as desired. When restraint assembly 10 is in the stowed position, cargo floor 15 is provided with a flat surface configuration unobstructed, and partially formed, by restraint assembly 10.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A restraint mechanism for releasably restraining a unit load device in an aircraft, the restraint mechanism comprising:
    a housing adapted to be connected to the aircraft;
    a pawl pivotally coupled to said housing for pivotal movement about a pivot axis with respect to said housing between a locked position and an unlocked position, said pawl including a first foot pivotally coupled to said housing, and a head adapted to releasably restrain movement of the unit load device when said pawl is in said locked position;
    a first cam assembly having a first end and a second end, said second end of said first cam assembly coupled to said pawl, said cam assembly including a first link and a second link, said first link pivotally coupled to said second link, said first link including said first end of said cam assembly and said second link including said second end of said cam assembly; and
    an actuator shaft coupled to said housing for selective rotation about a rotational axis with respect to said housing, said actuator shaft being coupled to said first link of said first cam assembly such that said first link conjointly pivots with said actuator shaft about said rotational axis;
    whereby rotational movement of said actuator shaft in a first rotational direction about said rotational axis pivots said pawl about said pivot axis toward said locked position of said pawl wherein said pawl is adapted to restrain movement of the unit load device, and wherein rotational movement of said actuator shaft in a second rotational direction about said rotational axis pivots said pawl about said pivot axis toward said unlocked position of said pawl wherein said pawl permits movement of the unit load device.

2. The restraint mechanism of claim 1 wherein said head of said pawl includes a top wall, a first side wall, and a second side wall spaced apart from said first side wall, said top wall, first side wall and said second side wall forming a cavity adapted to receive at least a portion of the unit load device when said pawl is in said locked position, said top wall adapted to restrain movement of the unit load device along a vertical axis of the aircraft, and said first side wall and said second side wall are adapted to restrain movement of the unit load device along a longitudinal axis of the aircraft.

3. The restraint mechanism of claim 1 wherein said first link of said first cam assembly includes a first end and a second end, said first end of said first link coupled to said actuator shaft for conjoint rotation with said actuator shaft about said rotational axis, said second link of said first cam assembly including a first end and a second end, said first end of said second link being pivotally coupled to said second end of said first link for pivotal movement about a first cam pivot axis, said second end of said second link being pivotally coupled to said pawl for pivotal movement about a second cam pivot axis.

4. The restraint mechanism of claim 3 wherein said second link includes a recess, said recess adapted to receive said actuator shaft such that said rotational axis of said actuator shaft is located between said first cam pivot axis and said second cam pivot axis when said pawl is in said locked position.

5. The restraint mechanism of claim 4 wherein said rotational axis of said actuator shaft, said first cam pivot axis of said first cam assembly and said second cam pivot axis of said first cam assembly are substantially coplanar with one another when said pawl is in the locked position.

6. The restraint mechanism of claim 3 wherein said first cam assembly includes a third link having a first end pivotally coupled to said second end of said first link for pivotal movement about said first cam pivot axis and a second end pivotally coupled to said pawl for pivotal movement about said second cam pivot axis, said first link being located between said second link and said third link.

7. The restraint mechanism of claim 1 including a connector member pivotally coupling said second end of said first cam assembly to said pawl.

8. The restraint mechanism of claim 1 including a connector member fixedly coupled to said pawl and pivotally coupled to said housing.

9. The restraint mechanism of claim 8 wherein said connector member comprises a pivot shaft extending into said first foot of said pawl, and including a fastener fixedly coupling said pivot shaft to said first foot of said pawl, said pivot shaft being pivotally coupled to said housing.

10. The restraint mechanism of claim 9 including a resilient biasing member coupled to said pivot shaft, said biasing member adapted to resiliently bias said pawl about said pivot axis.

11. The restraint mechanism of claim 1 wherein said housing includes a front wall, a rear wall and a first pawl chamber, said rear wall including a first pawl aperture in communication with said first pawl chamber, said pawl including a first leg coupling said first foot of said pawl to said head of said pawl, said first foot of said pawl located in said first pawl chamber and said first leg of said pawl extending outwardly from said first pawl chamber through said first pawl aperture in said rear wall of said housing.

12. The restraint mechanism of claim 11 wherein said housing includes a second pawl chamber and a third pawl chamber, said rear wall of said housing including a second pawl aperture in communication with said second pawl chamber and a third pawl aperture in communication with said third pawl chamber, said pawl including a second leg coupled to a second foot and a third leg coupled to a third foot, said second foot located within said second pawl chamber and pivotally coupled to said housing, said second leg extending outwardly from said second pawl chamber through said second pawl aperture, said third foot located in said third pawl chamber and pivotally coupled to said housing, said third leg extending outwardly from said third pawl chamber through said third pawl aperture, said second foot and said third foot of said pawl adapted to pivot about said pivot axis.

13. The restraint mechanism of claim 12 wherein said front wall of said housing includes a first pawl aperture in communication with said first pawl chamber, a second pawl aperture in communication with said second pawl chamber, and a third pawl aperture in communication with said third pawl chamber.

14. The restraint of claim 11 wherein said housing includes a first cam chamber located adjacent said first pawl chamber, said rear wall of said housing including a first cam aperture, said first end of said first cam assembly being located within said first cam chamber, said first cam assembly adapted to extend outwardly from said first cam chamber through said first cam aperture.

15. The restraint mechanism of claim 14 including a second cam assembly having a first end and a second end, said second end of said second cam assembly coupled to said pawl, said first end of said second cam assembly coupled to said actuator shaft, said housing including a second cam chamber, said rear wall of said housing including a second cam aperture, said first end of said second cam assembly being located within said second cam assembly chamber, said second cam assembly adapted to extend outwardly from said second cam chamber through said second cam aperture.

16. The restraint mechanism of claim 1 including an actuator coupled to said actuator shaft, said actuator adapted to selectively rotate said actuator shaft in said first rotational direction or said second rotational direction about said rotational axis.

17. The restraint mechanism of claim 1 including a first proximity sensor adapted to sense when said pawl is in said locked position, and a second proximity sensor adapted to sense when said pawl is in said unlocked position.

18. The restraint mechanism of claim 16 wherein the actuator includes a drive motor and a controller electrically coupled to the drive motor by a power-signal cable harness.

19. The restraint mechanism of claim 1 including a plate coupled to a wall of the housing for reinforcing and stiffening the housing.

20. A restraint assembly for releasably restraining a unit load device in an aircraft, the restraint assembly comprising:
   a guide rail adapted to be connected to the aircraft, said guide rail including a wall having an aperture; and
   a restraint mechanism including a housing connected to said guide rail,
   a pawl pivotally coupled to said housing for pivotal movement about a pivot axis with respect to said housing between a locked position and an unlocked position, said pawl including an exterior surface, a first foot pivotally coupled to said housing, and a head adapted to releasably restrain movement of the unit load device when said pawl is in said locked position, said pawl being aligned with said aperture in said wall of said guide rail, a first cam assembly having a first end and a second end, said second end of said first cam assembly coupled to said pawl, and an actuator shaft coupled to said housing for selective rotation about a rotational axis with respect to said housing, said first end of said first cam assembly coupled to said actuator shaft;

whereby rotational movement of said actuator shaft in a first rotational direction about said rotational axis pivots said pawl about said pivot axis toward said locked position of said pawl wherein said pawl is adapted to restrain movement of the unit load device, and whereby rotational movement of said actuator shaft in a second rotational direction about said rotational axis pivots said pawl about said pivot axis toward said unlocked position of said pawl wherein said pawl extends outwardly from said housing and through said aperture in said wall of said guide rail such that said pawl is adapted to permit movement of the unit load device.

21. The restraint assembly of claim 20 wherein said guide rail and said restraint mechanism are conjointly moveable between a deployed position and a stowed position with respect to a cargo floor of the aircraft, said exterior surface of said pawl being generally coplanar with an exterior surface of said wall of said guide rail when said pawl is in said locked position, such that said exterior surface of said pawl and said exterior surface of said wall of said guide rail are adapted to be generally coplanar with a surface of the cargo floor when said guide rail and said restraint mechanism are in said stowed position, said guide rail and said restraint mechanism adapted to selectively restrain a unit load device when said guide rail and said restraint mechanism are in said deployed position.

22. A restraint mechanism for releasably restraining a unit load device in an aircraft, the restraint mechanism comprising:

a housing adapted to be connected to the aircraft;

a pawl pivotally coupled to said housing for pivotal movement about a pivot axis with respect to said housing between a locked position and an unlocked position, said pawl including a first foot pivotally coupled to said housing, and a head adapted to releasably restrain movement of the unit load device when said pawl is in said locked position;

a first cam assembly having a first end and a second end, said second end of said first cam assembly coupled to said pawl; and an actuator shaft coupled to said housing for selective rotation about a rotational axis with respect to said housing, said first end of said first cam assembly coupled to said actuator shaft;

whereby rotational movement of said actuator shaft in a first rotational direction about said rotational axis pivots said pawl about said pivot axis toward said locked position of said pawl wherein said pawl is adapted to restrain movement of the unit load device, and wherein rotational movement of said actuator shaft in a second rotational direction about said rotational axis pivots said pawl about said pivot axis toward said unlocked position of said pawl wherein said pawl permits movement of the unit load device;

wherein said head of said pawl includes a top wall, a first side wall, and a second side wall spaced apart from said first side wall, said top wall, first side wall and said second side wall forming a cavity adapted to receive at least a portion of the unit load device when said pawl is in said locked position, said top wall adapted to restrain movement of the unit load device along a vertical axis of the aircraft, and said first side wall and said second side wall are adapted to restrain movement of the unit load device along a longitudinal axis of the aircraft.

23. A restraint mechanism for releasably restraining a unit load device in an aircraft, the restraint mechanism comprising:

a housing adapted to be connected to the aircraft;

a pawl pivotally coupled to said housing for pivotal movement about a pivot axis with respect to said housing between a locked position and an unlocked position, said pawl including a first foot pivotally coupled to said housing, and a head adapted to releasably restrain movement of the unit load device when said pawl is in said locked position;

a first cam assembly having a first end and a second end, said second end of said first cam assembly coupled to said pawl; and an actuator shaft coupled to said housing for selective rotation about a rotational axis with respect to said housing, said first end of said first cam assembly coupled to said actuator shaft;

whereby rotational movement of said actuator shaft in a first rotational direction about said rotational axis pivots said pawl about said pivot axis toward said locked position of said pawl wherein said pawl is adapted to restrain movement of the unit load device, and wherein rotational movement of said actuator shaft in a second rotational direction about said rotational axis pivots said pawl about said pivot axis toward said unlocked position of said pawl wherein said pawl permits movement of the unit load device;

wherein said housing includes a front wall, a rear wall and a first pawl chamber, said rear wall including a first pawl aperture in communication with said first pawl chamber, said pawl including a first leg coupling said first foot of said pawl to said head of said pawl, said first foot of said pawl located in said first pawl chamber and said first leg of said pawl extending outwardly from said first pawl chamber through said first pawl aperture in said rear wall of said housing.

24. The restraint mechanism of claim 23 wherein said housing includes a second pawl chamber and a third pawl chamber, said rear wall of said housing including a second pawl aperture in communication with said second pawl chamber and a third pawl aperture in communication with said third pawl chamber, said pawl including a second leg coupled to a second foot and a third leg coupled to a third foot, said second foot located within said second pawl chamber and pivotally coupled to said housing, said second leg extending outwardly from said second pawl chamber through said second pawl aperture, said third foot located in said third pawl chamber and pivotally coupled to said housing, said third leg extending outwardly from said third pawl chamber through said third pawl aperture, said second foot and said third foot of said pawl adapted to pivot about said pivot axis.

25. The restraint mechanism of claim 24 wherein said front wall of said housing includes a first pawl aperture in communication with said first pawl chamber, a second pawl aperture in communication with said second pawl chamber, and a third pawl aperture in communication with said third pawl chamber.

26. The restraint of claim 23 wherein said housing includes a first cam chamber located adjacent said first pawl chamber, said rear wall of said housing including a first cam aperture, said first end of said first cam assembly being located within said first cam chamber, said first cam assembly adapted to extend outwardly from said first cam chamber through said first cam aperture.

27. The restraint mechanism of claim 26 including a second cam assembly having a first end and a second end, said second end of said second cam assembly coupled to said pawl, said first end of said second cam assembly coupled to said actuator shaft, said housing including a second cam chamber, said rear wall of said housing including a second cam aperture, said first end of said second cam assembly being located within said second cam assembly chamber, said second cam assembly adapted to extend outwardly from said second cam chamber through said second cam aperture.

28. A restraint mechanism for releasably restraining a unit load device in an aircraft, the restraint mechanism comprising:

a housing adapted to be connected to the aircraft;

a pawl pivotally coupled to said housing for pivotal movement about a pivot axis with respect to said housing between a locked position and an unlocked position, said pawl including a first foot pivotally coupled to said housing, and a head adapted to releasably restrain movement of the unit load device when said pawl is in said locked position;

a first proximity sensor adapted to sense when said pawl is in said locked position, and a second proximity sensor adapted to sense when said pawl is in said unlocked position;

a first cam assembly having a first end and a second end, said second end of said first cam assembly coupled to said pawl; and an actuator shaft coupled to said housing for selective rotation about a rotational axis with respect to said housing, said first end of said first cam assembly coupled to said actuator shaft;

whereby rotational movement of said actuator shaft in a first rotational direction about said rotational axis pivots said pawl about said pivot axis toward said locked position of said pawl wherein said pawl is adapted to restrain movement of the unit load device, and wherein rotational movement of said actuator shaft in a second rotational direction about said rotational axis pivots said pawl about said pivot axis toward said unlocked position of said pawl wherein said pawl permits movement of the unit load device.

\* \* \* \* \*